(12) United States Patent
Wilen

(10) Patent No.: US 8,616,434 B2
(45) Date of Patent: Dec. 31, 2013

(54) MULTI-COMPONENT FORMS

(75) Inventor: Richard Wilen, Deerfield Beach, FL (US)

(73) Assignee: WILopEN Products, LC, Deerfield Beach, FL (US)

( * ) Notice: Subject to any disclaimer, the term of this patent is extended or adjusted under 35 U.S.C. 154(b) by 216 days.

(21) Appl. No.: 12/846,834

(22) Filed: Jul. 30, 2010

(65) Prior Publication Data

US 2011/0025037 A1 Feb. 3, 2011

Related U.S. Application Data

(63) Continuation-in-part of application No. 12/777,810, filed on May 11, 2010, which is a continuation-in-part of application No. 12/768,671, filed on Apr. 27, 2010, now Pat. No. 8,104,795, which is a continuation-in-part of application No. 11/365,071, filed on Feb. 28, 2006, now Pat. No. 7,703,808, said application No. 12/777,810 is a continuation-in-part of application No. 12/464,740, filed on May 12, 2009.

(60) Provisional application No. 61/238,575, filed on Aug. 31, 2009, provisional application No. 61/052,377, filed on May 12, 2008.

(51) Int. Cl.
*B65D 27/00* (2006.01)
*B65D 27/06* (2006.01)
*G09F 1/00* (2006.01)

(52) U.S. Cl.
USPC ........... 229/70; 229/92.1; 229/92.8; 229/300; 229/301; 40/124.06

(58) Field of Classification Search
USPC .......... 229/75, 70, 92.1, 92.3, 92.8, 300, 301; 40/124.06
See application file for complete search history.

(56) References Cited

U.S. PATENT DOCUMENTS

| 498,761 A | 6/1893 | Becker |
| 2,504,277 A | 4/1950 | Otterson |
| 3,141,549 A | 7/1964 | Koehler |
| 3,356,286 A * | 12/1967 | Greason .......................... 229/70 |
| 3,656,684 A * | 4/1972 | Meehan ....................... 229/92.8 |

(Continued)

FOREIGN PATENT DOCUMENTS

| EP | 0695649 | 2/1996 |
| GB | 2285412 | 7/1995 |

(Continued)

*Primary Examiner* — Jes F Pascua
(74) *Attorney, Agent, or Firm* — Johnson & Martin, P.A.; James David Johnson

(57) ABSTRACT

A printable and imprintable multi-component form is described that features detachable components including a correspondence piece, an envelope, and a variable element. The multi-component form is formed from two plies of material such as paper, plastic, foil, or paperboard. The correspondence piece can be a greeting card or a post card. The variable element can be a scrip, a customizable component, e.g., a wallet-sized photograph, or a product stamp. The scrip can be any non-monetary certificate exchangeable for currency, goods, or services including, for example, a gift card or a gift certificate. The assembled envelope can be used to mail the correspondence piece and variable element to a recipient. The detachable components can be separated from one another and from the sheet of material of the form at a plurality of lines of separation such as perforations.

22 Claims, 12 Drawing Sheets

(56) References Cited

U.S. PATENT DOCUMENTS

| | | | |
|---|---|---|---|
| 4,011,985 A * | 3/1977 | Simson | 229/68.1 |
| 4,103,820 A | 8/1978 | Mathison | |
| 4,195,864 A | 4/1980 | Morton | |
| 4,441,270 A | 4/1984 | Crowell | |
| 4,543,082 A | 9/1985 | Stenner | |
| 4,733,856 A | 3/1988 | Gunther | |
| 4,860,946 A * | 8/1989 | Braud | 229/69 |
| 5,044,669 A * | 9/1991 | Berry | 283/81 |
| 5,104,036 A * | 4/1992 | Rutkowski et al. | 229/301 |
| 5,133,496 A | 7/1992 | Davidson | |
| 5,288,015 A * | 2/1994 | Sauerwine | 229/305 |
| 5,377,904 A | 1/1995 | Michlin | |
| 5,437,478 A | 8/1995 | Gaines | |
| 5,697,547 A | 12/1997 | Kraus | |
| 5,870,718 A | 2/1999 | Spector | |
| 5,950,910 A | 9/1999 | Petkovsek | |
| 6,027,014 A * | 2/2000 | Cochran | 229/70 |
| 6,155,476 A * | 12/2000 | Fabel | 229/92.3 |
| 6,315,206 B1 | 11/2001 | Hansen | |
| 6,330,544 B1 | 12/2001 | Walker | |
| 6,409,079 B1 | 6/2002 | Hutchinson | |
| 6,470,608 B1 | 10/2002 | Edwards | |
| 6,493,970 B1 | 12/2002 | McCarthy | |
| 6,601,755 B2 | 8/2003 | Gillespie | |
| 6,725,587 B2 | 4/2004 | Collins | |
| 6,732,459 B1 | 5/2004 | Clark | |
| 6,746,052 B1 | 6/2004 | Reynolds | |
| 6,754,636 B1 | 6/2004 | Walker | |
| 6,922,673 B2 | 7/2005 | Karas | |
| 7,188,762 B2 | 3/2007 | Goade | |
| 7,204,048 B2 | 4/2007 | Kershner | |
| 7,209,889 B1 | 4/2007 | Whitfield | |
| 7,303,121 B2 | 12/2007 | Martinez | |
| 7,315,828 B1 | 1/2008 | McCarthy | |
| 2003/0130907 A1 | 7/2003 | Karas | |
| 2003/0150141 A1 | 8/2003 | Waldron | |
| 2003/0150142 A1 | 8/2003 | Street | |
| 2004/0046035 A1 | 3/2004 | Davila | |
| 2004/0099730 A1 | 5/2004 | Tuchler | |
| 2004/0139318 A1 | 7/2004 | Fiala | |
| 2004/0205138 A1 | 10/2004 | Friedman | |
| 2004/0254833 A1 | 12/2004 | Algiene | |
| 2005/0116015 A1 | 6/2005 | Yost | |
| 2005/0263587 A1 | 12/2005 | Martinez | |
| 2005/0275870 A1 | 12/2005 | Elarde | |
| 2006/0000127 A1 | 1/2006 | Schindele | |
| 2006/0186196 A1 | 8/2006 | Schultz | |
| 2006/0200362 A1 | 9/2006 | Paciolla | |
| 2006/0224452 A1 | 10/2006 | Ng | |
| 2006/0255154 A1 | 11/2006 | Newbrough | |
| 2006/0266665 A1 | 11/2006 | Clarke | |
| 2006/0273153 A1 | 12/2006 | Ashby | |
| 2007/0017973 A1 | 1/2007 | Blank et al. | |
| 2007/0157021 A1 | 7/2007 | Whitfield | |
| 2007/0168863 A1 | 7/2007 | Blattner | |
| 2007/0182155 A1 | 8/2007 | Duffy | |
| 2007/0187487 A1 | 8/2007 | Wilen | |
| 2007/0192784 A1 | 8/2007 | Postrel | |
| 2007/0288340 A1 | 12/2007 | Kravitz | |
| 2008/0195460 A1 | 8/2008 | Varghese | |
| 2008/0208745 A1 | 8/2008 | Friedman | |
| 2008/0294977 A1 | 11/2008 | Friedman | |
| 2009/0063297 A1 | 3/2009 | Dooley | |
| 2009/0222367 A1 | 9/2009 | Jenkins | |
| 2009/0283594 A1 | 11/2009 | Walton | |
| 2010/0017278 A1 | 1/2010 | Wilen | |
| 2010/0269380 A1 | 10/2010 | Wilen | |
| 2010/0314276 A1 | 12/2010 | Wilen | |
| 2011/0124390 A1 | 5/2011 | Wilen | |
| 2011/0125607 A1 | 5/2011 | Wilen | |

FOREIGN PATENT DOCUMENTS

| | | |
|---|---|---|
| WO | 0167364 | 9/2001 |
| WO | 2007092057 | 8/2007 |
| WO | 2010132575 | 11/2010 |
| WO | 2011026123 | 3/2011 |

* cited by examiner

MULTI-COMPONENT FORMS

CROSS-REFERENCE TO RELATED APPLICATION

This application is a continuation-in-part application of and claims priority from U.S. nonprovisional patent application Ser. No. 12/777,810 filed on May 11, 2010, claiming priority from U.S. provisional patent application No. 61/238,575 filed on Aug. 31, 2009, and which is a continuation-in-part application of and claims priority from U.S. patent application Ser. No. 12/768,671 filed on Apr. 27, 2010 (now U.S. Pat. No. 8,104,795), which is a continuation-in-part application of U.S. nonprovisional patent application Ser. No. 11/365,071 filed on Feb. 28, 2006 (now U.S. Pat. No. 7,703,808), and is a continuation-in-part application of U.S. nonprovisional patent application Ser. No. 12/464,740 filed on May 12, 2009, which claimed priority from U.S. provisional patent application No. 61/052,377 filed on May 12, 2008. The foregoing applications are incorporated in their entirety herein by this reference.

FIELD OF THE INVENTION

The present invention relates to multi-purpose forms. More particularly, the invention relates to multi-purpose forms having detachable components that can be customized by imprinting thereon using computer software and a printer to create user-customized products.

BACKGROUND

Forms featuring detachable components are manufactured in commercial printing plants using printing presses and finishing equipment. Currently, forms such as snap-apart forms, two- and three-level forms having areas for imprinting using a typewriter or manually writing thereon, labels, and business cards are available for purchase by consumers in packs. Such printable forms include customizable spaces onto which a user may print text or images chosen by the user. The forms typically feature a plurality of identically sized and shaped detachable components. Printing or imprinting on the customizable spaces of conventional forms may be accomplished using a desktop printer or any other printing device of the appropriate size and feed capability.

Conventional greeting cards are sold or distributed as individual units or in packs of identical or varying cards at retail locations and websites. Such greeting cards are generally not customizable by the user with the exception of some blank spaces on interior surfaces of the greeting card that may be reserved by the manufacturer to permit the purchasing user to write a message or to include any other printed or typically handwritten text, image, or symbol desired to be transmitted to a recipient. Exterior surfaces, and particularly the front exterior surface, of such greeting cards almost always include artwork, symbols, images, or text printed thereon by the manufacturer, and leave little or no space for user customizations. Forms featuring a single component such as a greeting card have also been available in commerce for imprinting thereon by a consumer using a desktop printer. Such printable and imprintable forms often are packaged with a separate envelope on which the consumer may imprint or write addresses and affix postage.

As the consumer market moved away from the use of cash, direct debit and credit became popular payment alternatives, gift cards came into common usage. Gift certificates have been used in place of cash when consumers have desired to give a gift that could be used by a recipient user to purchase goods or services. Gift cards have rapidly replaced gift certificates as the dominant means of gift giving either in the form of cash credit, a specific good, or a specific service. Gift cards are preferable over the use of gift certificates because, unlike gift certificates, conventional plastic gift cards include magnetic stripes onto which data can be encoded, e.g., the amount of funds contributed by the giftor, the gift (i.e., good or service) selected by the giftor, the giftor's personal information, the giftee's personal information, and the bank, store, or manufacturer's information. Gift cards were also preferred over gift certificates because, being the size of a credit card or debit card, they can fit into a smaller area such as a wallet. Gift cards were also viewed as advantageous over gift certificates because of the security features and point-of-sale transaction entry capabilities included in the magnetic encoding of the gift cards.

Conventional gift cards are purchased or obtained at a retail location such as a store or website, and include pre-printed graphics and text printed thereon by the manufacturer or issuer of the gift card. Such pre-printed gift cards do not permit the purchaser (i.e., the giftor) to customize the gift card prior to its delivery to a recipient (i.e., the giftee).

Greeting cards and envelopes can also be purchased or acquired from an on-line service. Greeting cards generated by on-line services may allow the user to make limited personalization and customization of a card by selecting themes, images and messages from a library of such content. In some instances, the on-line service may permit the user to upload photographs for additional customization. Such on-line service generated greeting cards generally do not have the ability to attach a gift card, nor do they include detachable sections that can be used for another purpose upon receipt by the recipient.

Gift cards and greeting cards, in addition to envelopes, have not been previously provided in a combined multi-purpose imprintable format having detachable components so that a consumer or end user can obtain the multi-purpose form that may include one or more sheets and, using a desktop printer or other printing device, imprint thereon certain customized text, images, or symbols selected by the user.

SUMMARY

A multi-purpose printable form can be manufactured to include one, two, three or more sheets, each of which can include one or more detachable components. Detachable components that may be formed as part of the sheet can include a greeting card, a gift card, and an envelope. Each of the detachable components can be used alone or in combination with the other detachable components of the multi-purpose form. Each sheet can include a frame formed from the paper or other material of the sheet. The frame can be formed around the side edges of each detachable component, or the sheet may be constructed so that the frame is formed only around the outside edges of each sheet. Each sheet may also include no frame at all but only detachable components connected to one another, or in another embodiment where the multi-purpose form includes a plurality of sheets, some sheets may include a frame while other sheets do not. The detachable components can be sized, shaped, and arranged on the sheet so as to maximize the usage of paper included in each sheet and to reduce waste by ensuring that the frame forms only a minimally necessary portion of the sheet.

The detachable components may be torn, punched out, or otherwise detached from the sheet along lines of separation. The lines of separation can be perforations that assist the user in cleanly removing each detachable component from the sheet without creating rips in the detachable component or leaving hanging paper fragments that result when two detachable components are separated along a line of separation (e.g., a fold line) that does not include perforations. Microperforations can also be used to provide the cleanest separation so that the edges of the separated detachable components appear smooth.

The multi-purpose form can include graphics and text printed thereon during manufacturing or the form may be supplied to the user totally blank. Software that can be installed on the user's computer or accessed remotely on a website via the Internet can be used to customize and imprint customizations on the multi-purpose form.

The terms "print" and "printable" as used herein relate to printing on one of the multi-purpose forms during the manufacturing of the form, or printing on a surface of the form in a first instance by a manufacturer. The terms "imprint" and "imprintable" as used herein refer to printing on one of the forms by a user subsequent to manufacturing. Imprinting can be accomplished manually using a pen, pencil, or other handheld writing instrument, or mechanically using a printer or printing device. For example, the user may imprint customizations onto a blank form in the first instance where the manufacturer has not printed any information on the form during manufacturing, or the user may imprint customizations in a second, third, fourth or other instance onto a form that includes information printed thereon by the manufacturer during manufacturing. By way of further example, a form that includes information printed thereon by the manufacturer during manufacturing is printed in the first instance, customizations subsequently printed onto the form by a giftor are imprinted in the second instance, and additional information thereafter printed onto the same form by a giftee is imprinted in the third instance.

The invention features multi-component forms having detachable components that can be customized by imprinting thereon using computer software and a printer or manually with pen and ink to create user-customized products.

Although there are references to locations of perforations, scores, die cuts, kiss die cuts, separable pieces created, and sizes of each component, these labels and descriptions are for illustrious purposes only. With the ability to move these elements around allows for the production the same elements in different locations on the same form.

All formats can be manufactured to include one, two, three or more sheets, each of which can include one or more detachable components. Detachable components that may be formed as part of the sheet and the sheets can be constructed with variable levels and plies and can include a greeting card, an envelope and other detachable components. Each of the detachable components can be used alone or in combination with the other detachable components of the combined greeting card, envelope and variable element printable and imprintable form.

The terms "print" and "printable" as used herein relate to printing on one of the multi-component forms during the manufacturing of the form, or printing on a surface of the form in a first instance by a manufacturer. The terms "imprint" and "imprintable" as used herein refer to printing on one of the forms by a user subsequent to manufacturing. Imprinting can be accomplished manually using a pen, pencil, or other handheld writing instrument, or mechanically using a printer or printing device.

Each sheet can include a frame formed from the paper or other material of the sheet. The frame can be formed around the side edges of each detachable component, or the sheet may be constructed so that the frame is formed only around the outside edges of each sheet.

Each sheet may also include no frame at all but only detachable components connected to one another.

In another embodiment where the combined greeting card, envelope and variable element printable and imprintable form includes a plurality of sheets, some sheets may include a frame while other sheets do not.

The variable elements can be sized, shaped, and arranged on the sheet so as to maximize the usage of paper included in each sheet and to reduce waste by ensuring that the frame forms only a minimally necessary portion of the sheet.

The general manufacturing methodology is:

First, to full color litho print the entire product and all its components;

Second step is high speed, high quality inkjet personalization, which is performed simultaneously during printing;

Final manufacturing step is to glue, die cut, fold, and seal and create other elements as necessary.

Using spot glue and special glue patterns allows creation of pockets, cards, and packaging pieces that are later used as components and elements of the final format.

Another manufacturing process that may or may not be used is packaging. Packaging and packaging materials will vary based on the distribution channel.

Different sequences of events can be used depending on the final piece format being manufactured.

One advantage of the multi-purpose form is that it permits a user to create a customized greeting card and gift card to give to a recipient in replacement of a conventional store-bought greeting card and gift card, neither of which can be customized by the user to the extent desired by many users. The multi-purpose form permits the user to customize the graphics and text of both the greeting card and the gift card. Customizable text can include imprinting of the sender (e.g., user or giftor) or recipient's (e.g., giftee) name, address, and other contact information.

Another advantage of the multi-purpose form is that it allows a user to shop for gifts for a recipient from home, from an office, or from any location that is remote to a store. Once the user obtains the multi-purpose form, the user can customize the graphics and text on the detachable components using a printer, select a gift or cash value that can be imprinted on the gift card, greeting card or on both, and fund the card via a website operated by the card issuer, a manufacturer, a retailer, a distributor, a bank, or a merchant processor.

Still another advantage of the multi-purpose form is that users become more involved in the gift giving process because of the craft and artistic aspects of customizing or decorating, imprinting, and assembling the multi-purpose form and its detachable components into the final pieces (e.g., greeting card, gift card, and envelope) for delivery to the recipient.

Yet another advantage of the multi-purpose form is that its usage increases e-commerce conversions, e.g., finishing of gift card purchase transactions, thereby resulting in fewer abandoned on-line shopping carts where customers fail to complete the purchase after selecting an item for sale on a website.

Yet another advantage of the multi-purpose form is that it can be used with a website to collect and compile both the giftor and giftee's personal information into a database, which enhances the security of e-commerce and permits the retailer, manufacturer, advertiser, or website system operator to market goods and services to the giftor and giftee.

Still another advantage of the multi-purpose form is that it can delivered directly to the user's home, solicited or unsolicited, which can increase spending and usage of the gift card component of the form as opposed to relying upon users to visit a retail location having a gift card mall to purchase and fund a gift card.

Still another advantage of the multi-purpose form is that it may be constructed so as to be flat and of a uniform or nearly uniform thickness so that when a plurality of the multi-purpose forms are packaged, the packaged forms comply with United States Postal Service or other mailing or courier service guidelines and regulations related to the required flatness of printed materials being mailed.

Yet another advantage of the multi-purpose form is that it allows the user to imprint a greeting card, a gift card, and an envelope all using a desktop printer by feeding a single or more than one sheet through the printer. The imprinting of all of these components may be accomplished simultaneously where the printer includes features permitting front and back printing of a sheet during a single pass through the printer.

Yet another advantage of the multi-purpose form is that, in embodiments including a gift card, paper gift cards are safer to mail than plastic cards due to their slim thickness that cannot easily be felt through a closed envelope as opposed to thicker plastic cards that are easily recognized by touching the surfaces of a closed envelope. As an additional safety feature, a website of the systems described herein for use with the multi-purpose form can be used to register a gift card to its intended recipient so that only the intended recipient can redeem the gift card using a login, password, or other information that can be used to confirm the recipient's identity through the website.

Accordingly, the invention can feature a multi-component form that includes a single sheet having at least two connected plies of material. The single sheet can further include detachable components including at least an envelope, a correspondence piece, and a variable element.

In another aspect, the invention can feature the at least two connected plies of material including two separate and distinct sheets of material.

In another aspect, the invention can feature the at least two connected plies of material including two halves of a single sheet of material folded widthwise at a center line.

In another aspect, the invention can feature the variable element being a scrip.

In another aspect, the invention can feature the variable element being a photograph that can be imprinted to create a wallet-size photograph capable of fitting into a wallet.

In another aspect, the invention can feature the variable element being a business card.

In another aspect, the invention can feature the sheet further including a frame to which the detachable components are attached and are detachable therefrom.

In another aspect, the invention can feature the correspondence piece being a greeting card or a post card.

In another aspect, the invention can feature the single sheet further including an additional detachable component on which a photograph can be imprinted to create a wallet-size photograph capable of fitting into a wallet.

In another aspect, the invention can feature the envelope including a pocket formed in a space between the two connected plies of material of the sheet. The two plies can be adhered together on three sides.

In another aspect, the invention can feature the envelope further including a score line that can be broken to open the pocket.

In another aspect, the invention can feature the envelope further including a lid portion that features a strip of adhesive for sealing the envelope.

In another aspect, the invention can feature the scrip being a gift card, a gift certificate, a coupon, or any non-monetary certificate that is redeemable for currency, goods, or services of value.

In another aspect, the invention can feature the sheet including lines of separation from which the detachable components can be separated.

In another aspect, the invention can feature the lines of separation being perforations.

In another aspect, the invention can feature the sheet including a first surface, a second surface, a top edge, a bottom edge, and two side edges.

In another aspect, the invention can feature the sheet including pre-printed information printed on at least one of the first surface and the second surface.

In another aspect, the invention can feature the detachable components including customizable spaces on which a user may imprint or affix the user's own customizations.

In another aspect, the invention can feature the customizations including at least one imprinted, written, drawn, embossed, or affixed item that can be text, an image, a symbol, a label, or a stamp.

In another aspect, the invention can feature each individual multi-component form including a form identification number that uniquely identifies the multi-component form.

In another aspect, the invention can feature the detachable components further including one or more product stamps.

In another aspect, the invention can feature the one or more product stamps each including a gift representation.

In another aspect, the invention can feature the detachable components further including a coupon.

In another aspect, the invention can feature the detachable components further including a postage stamp that can be affixed to the envelope as postage paid for mailing the envelope and its contents.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
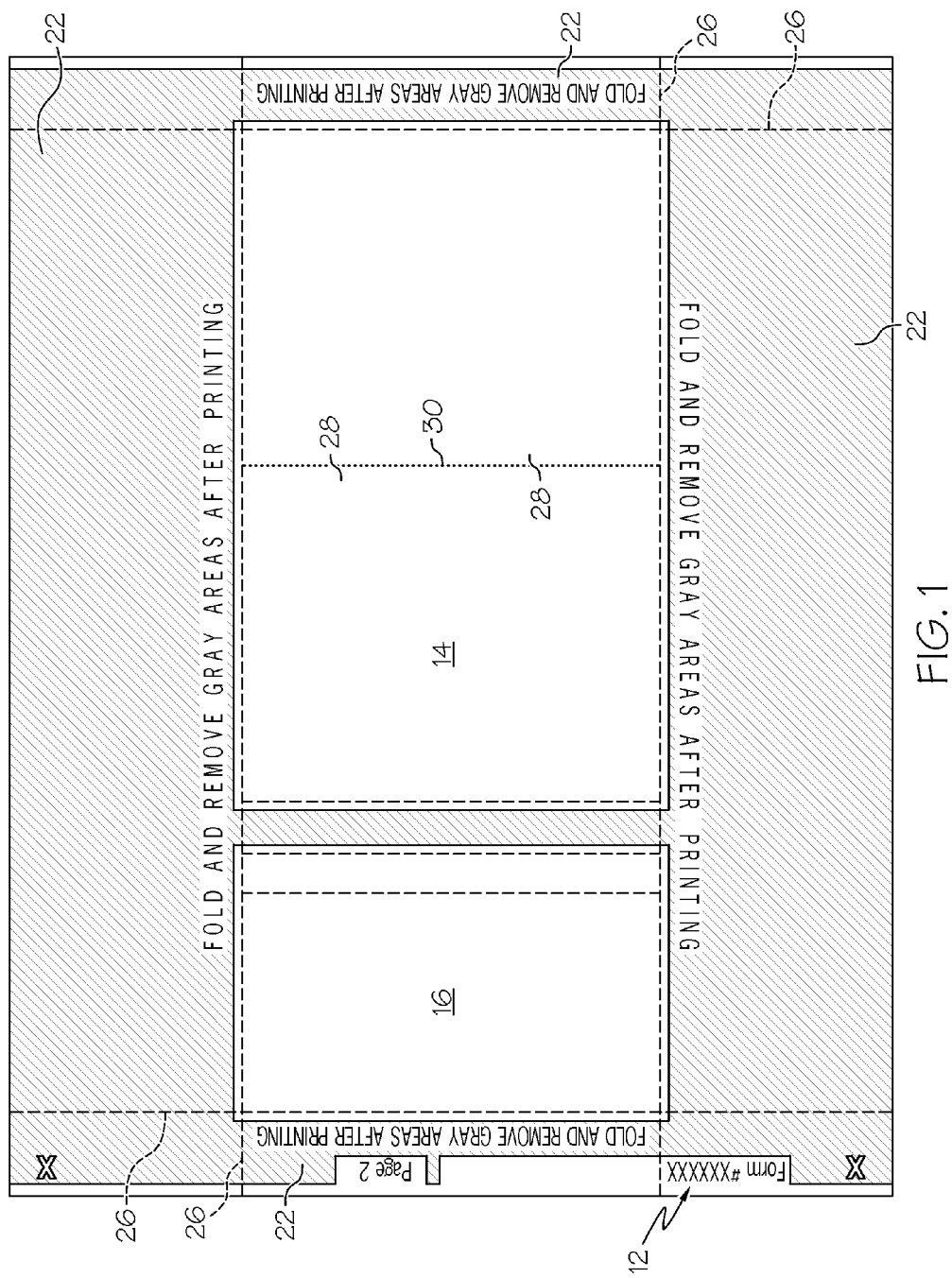
FIG. 1 is a front plan view of a multi-purpose form featuring a scrip and a greeting card.
Figure 2:
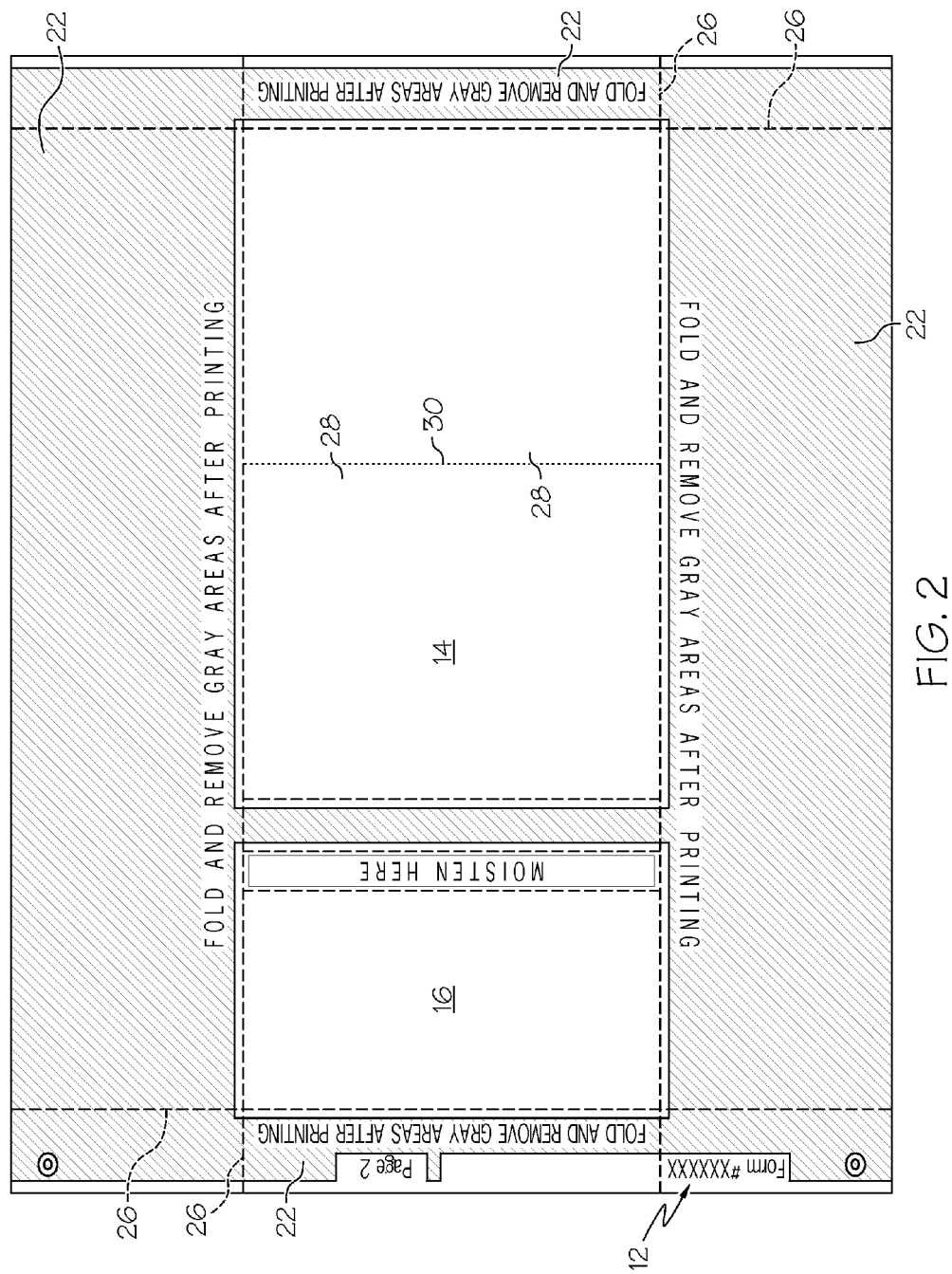
FIG. 2 is a rear plan view of the multi-purpose form of FIG. 1.
Figure 3:
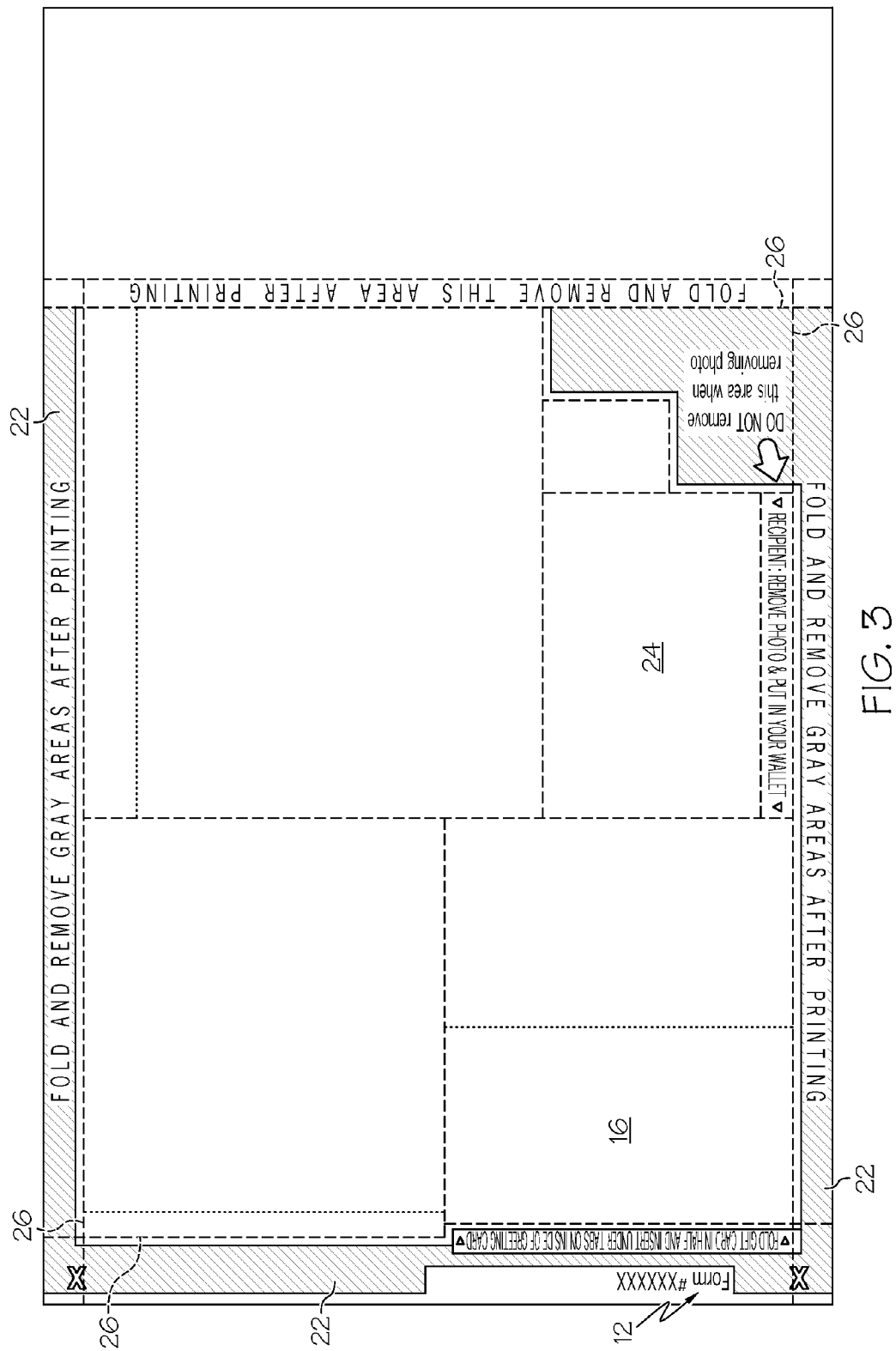
FIG. 3 is a front plan view of a two-ply multi-purpose form.
Figure 4:
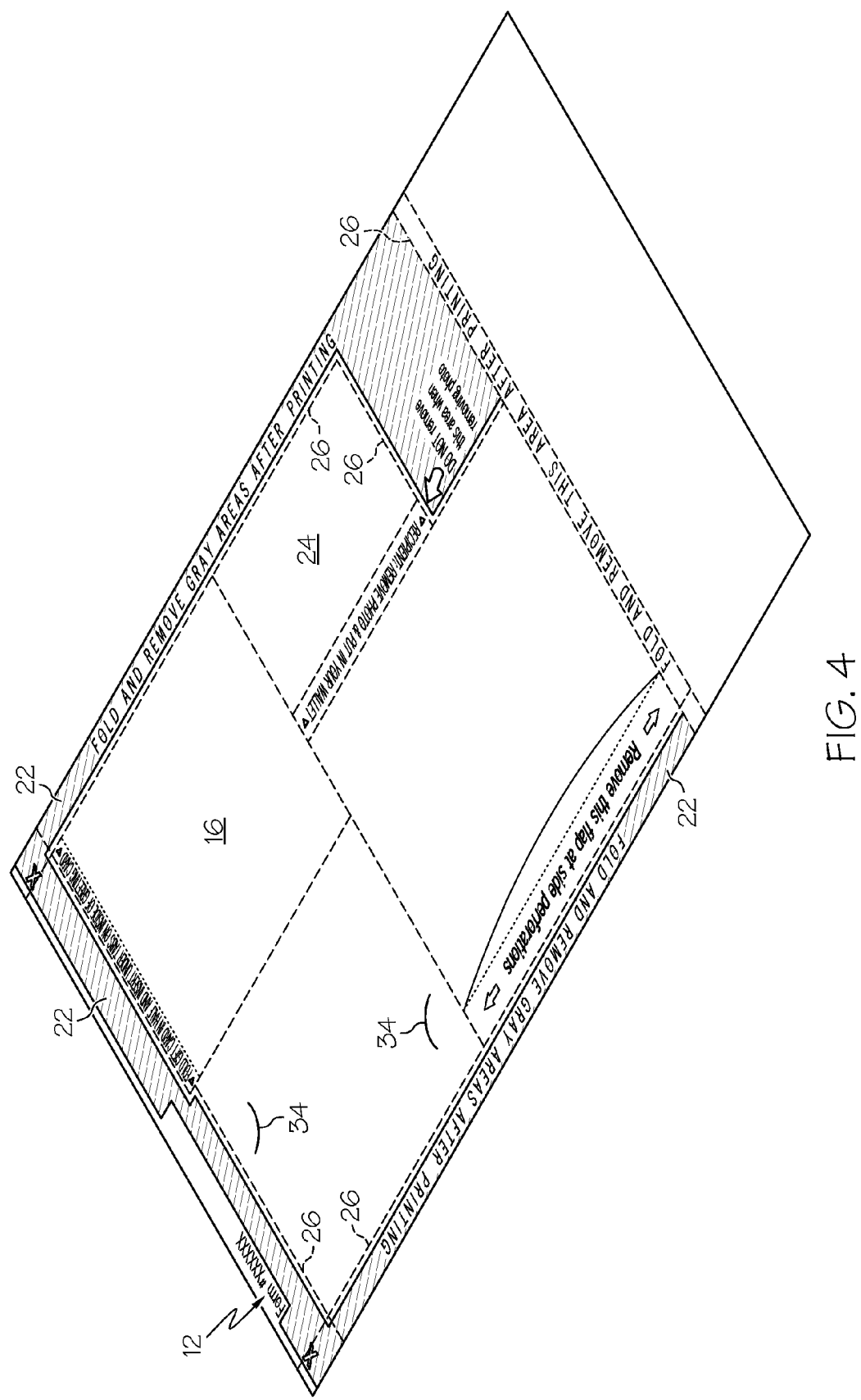
FIG. 4 is a perspective view of the multi-purpose form of FIG. 3 showing the pocket formed between the two plies of paper.
Figure 5:
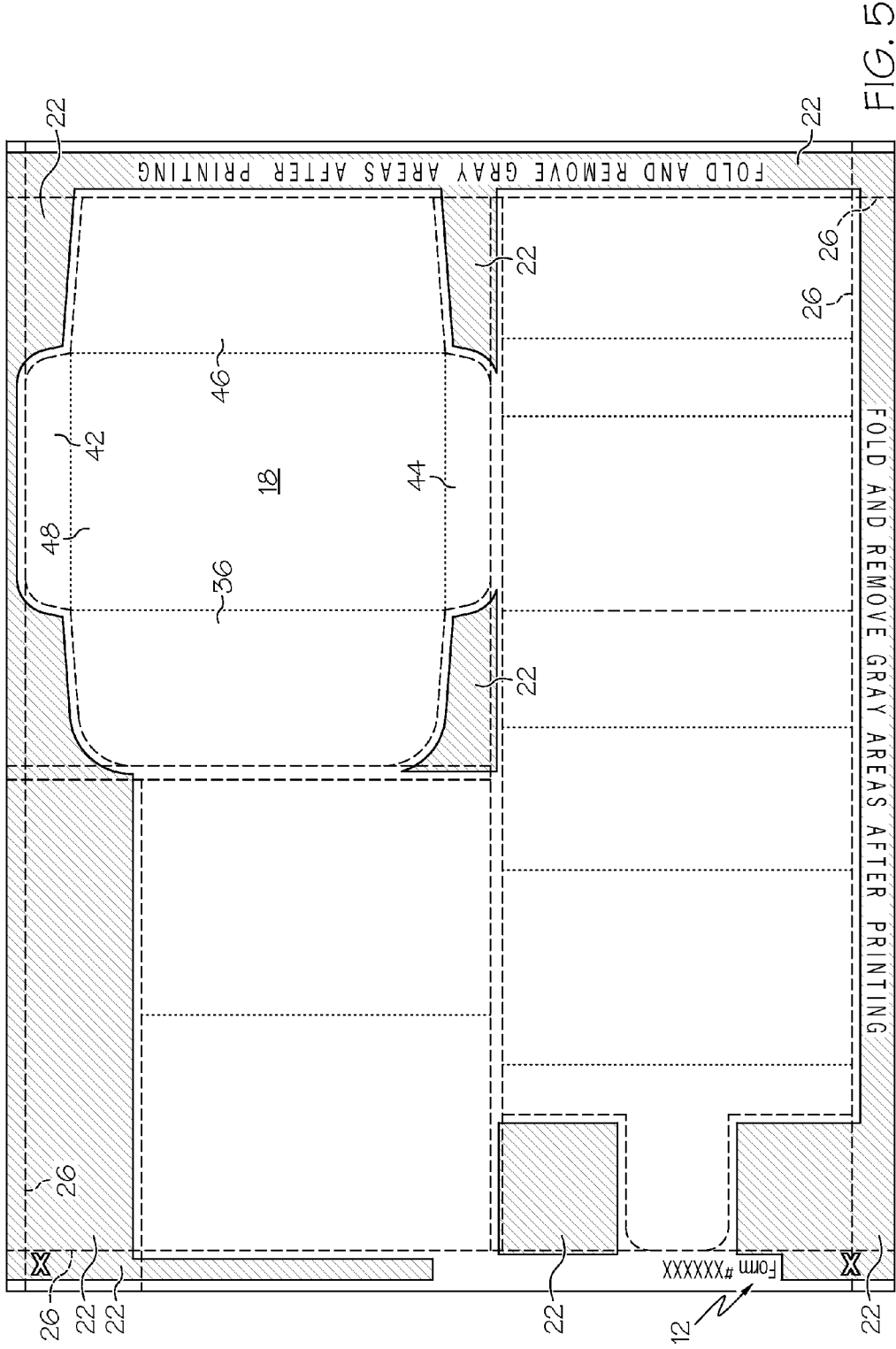
FIG. 5 is a front plan view of another embodiment of a multi-purpose form featuring a scrip, a greeting card, and an envelope piece.
Figure 6:
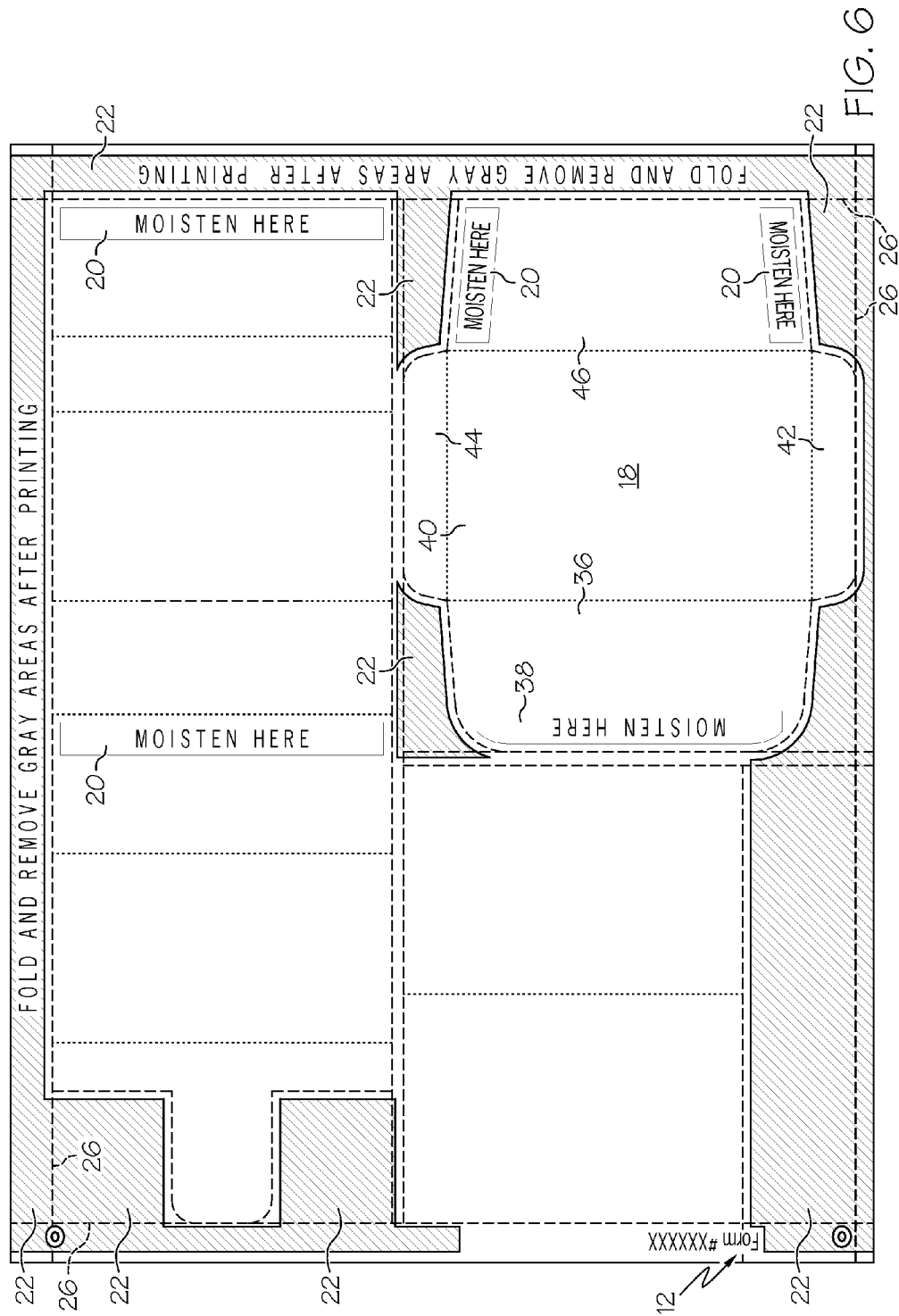
FIG. 6 is a rear plan view of the multi-purpose form of FIG. 5.
Figure 7:
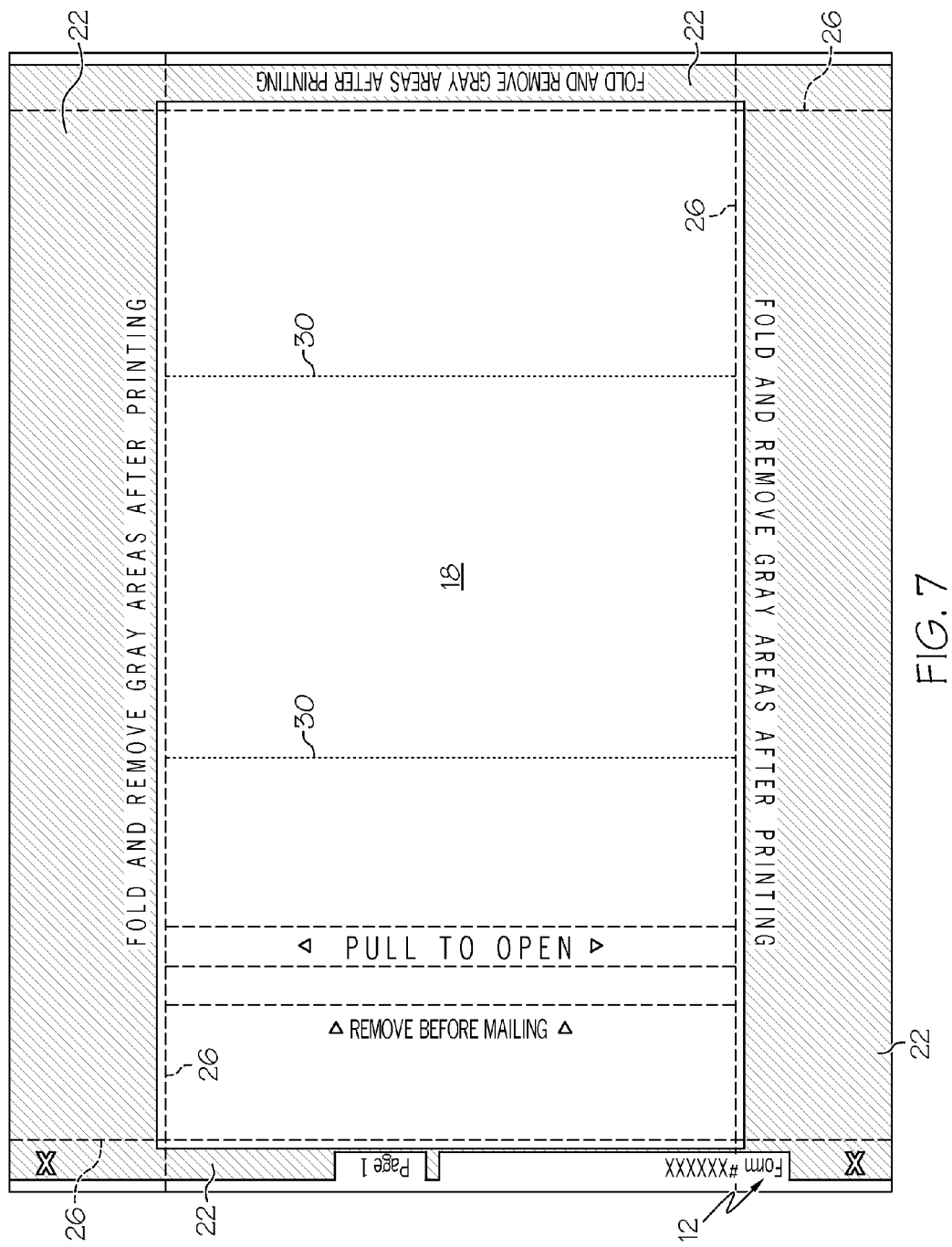
FIG. 7 is a front plan view of another embodiment of the multi-purpose form of FIG. 1 including a second sheet featuring an envelope as a detachable component.
Figure 8:
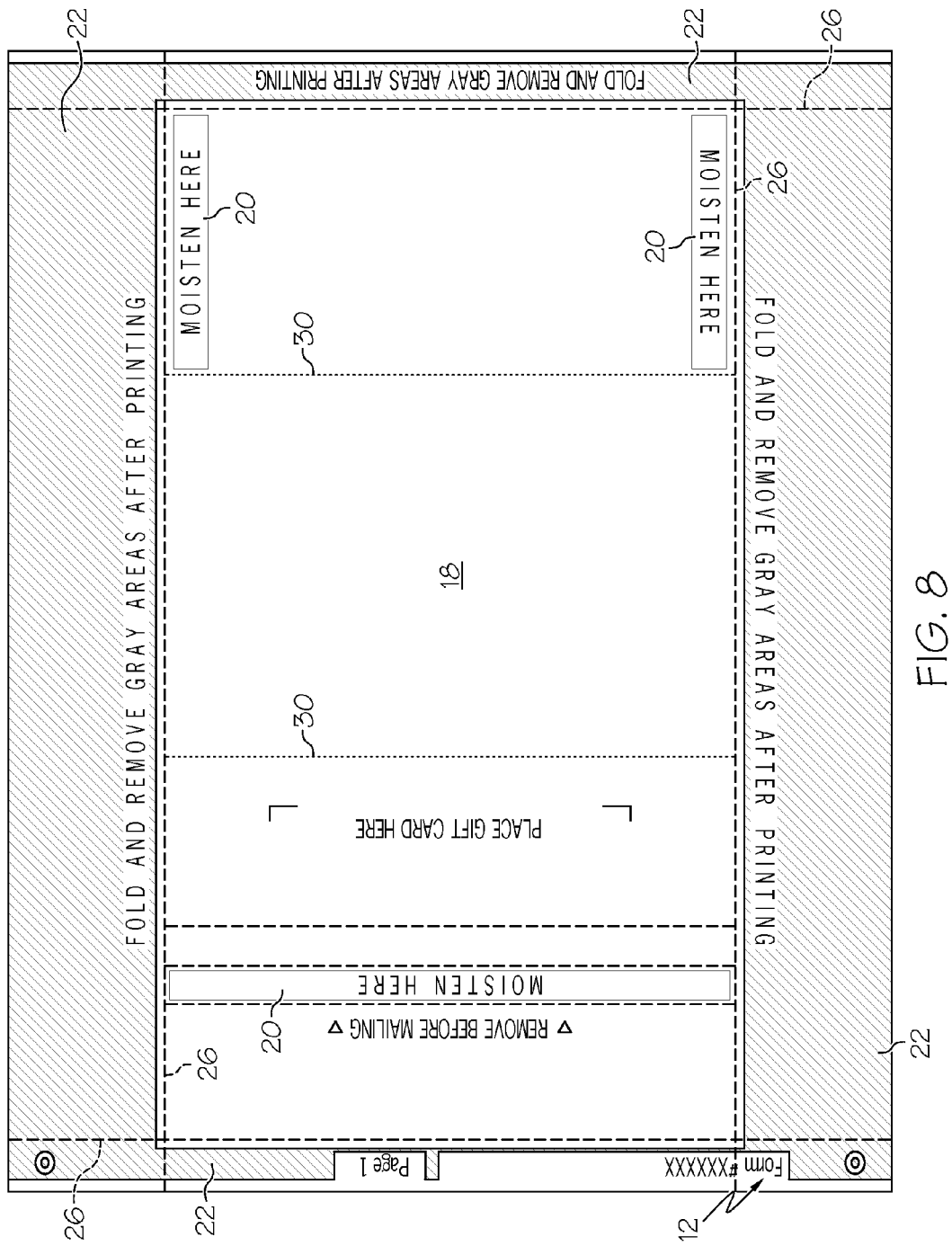
FIG. 8 is a rear plan view of the multi-purpose form of FIG. 7.

The invention provides interactive gifting systems and methods that can include multimedia components. The gifting system can be utilized by a gift card issuer to promote and advertise retail products and services to a user through gifting, entertainment, and game and rewards methods. The user can be a consumer, and the consumer can be a giftor (i.e., a gift giver) or a giftee (i.e., gift recipient). The card issuer can be an advertiser, a retailer, a manufacturer, or a service provider.

The invention can include a gift card system that allows gift-giving by a giftor to a giftee and serves as an advertising and marketing tool for goods and services produced, provided, and sold by manufacturers and retailers. The gift card system can include a gift card, which may be a physical gift card, an electronic gift card, or both. The system may include only a single gift card so that the giftor can purchase his or her own greeting card and envelope within which the gift card can be inserted.

In an exemplary embodiment, the gift card can be a combination gift card, greeting card, instruction sheet, and envelope. These components can form a gift card package that can be delivered to the giftee. The gift card package can also include a catalog, a brochure, a pamphlet, or another suitable insert containing images or descriptions of products that can be purchased by the giftor for the giftee. These components of the exemplary embodiment may be manufactured by any suitable printing and folding means. Each gift card can be personalized with a unique card identifier such as, for example, a hexadecimal number or a standard sixteen-digit gift card number that may be accepted for payment at point-of-sale (POS) terminals at retail locations. The gift card can also be marked with or have printed or affixed thereon a product or retailer name or logo. The gift card can also have a description of a gift item selected by the giftor printed thereon or affixed thereto. In other embodiments, either or both of the greeting card and the envelope may also include product or retailer names, logos, or descriptions printed thereon or affixed thereto.

In another embodiment, the system may include only a gift card, a greeting card, and an envelope. In still another embodiment, the system may include only a gift card and an envelope. In still other embodiments, either or both of the greeting card and the instructions may be omitted. In one embodiment, the system can further include a receipt. In one embodiment, the gift card system can include an envelope that is manufactured around the gift card and other contents (e.g., greeting card, instruction sheet, and catalog) so that these items are enclosed within the envelope simultaneously with the manufacturing of the envelope.

The physical gift card can be a gift card constructed from paper, plastic, or another suitable material on which indicia may be printed, embossed, engraved, stamped, or affixed. The electronic gift card can be a downloadable file, a web page, a virtual card or an e-mail, any of which may contain alphanumeric text and other type characters, images, audio data, video data, or other types of data suitable for inclusion in or attachment to the electronic gift card. The gift card can be redeemable for a gift item. The gift item can be a good, e.g., a retail item such as a shirt or a television, or a service, such as, for example, a manicure or a golf lesson. In another embodiment, the gift card can be redeemable for money.

In embodiments in which the gift card is a physical gift card, the gift card can be a printable email card, a two-dimensional gift card, or a three-dimensional card. In one embodiment, the two-dimensional gift card can include a form that features a single sheet having perforations to separate a detachable gift card, greeting card, and envelope. In another embodiment, the three-dimensional gift card can be pre-scored and/or pre-folded and may include a pop-up portion, which is folded in such a way that a portion of the card "pops up" or rises when the card is changed from a closed configuration to an open configuration. The pop-up portion of the card may include a photograph, e.g., a photograph of the giftor, artwork, a logo, alphanumeric text, or any other desired information or images. The three-dimensional pop-up cards can be in the form of a greeting card or a business card and may also include a gift representation that visually represents a gift item selected by the giftor for the giftee. In one embodiment, the business card can be an expandable card. The gift card may be custom designed for or by the giftor or may be selected by the giftor from among one or more templates provided by the card issuer.

The greeting card and gift card sections can be personalized by the giftor. The personalized gift card can be further customized using personal information of the giftor and/or of the giftee. Personal information can include a name, address, location information, photograph, e-mail address, birth date, anniversary date, or other personally significant information related to either or both of the giftor and the giftee.

The gift card system can further include a gift representation of at least one gift item. In an exemplary embodiment, the gift card system can include a plurality of gift representations each of which depicts a unique gift item. The gift representations can be depicted in the form of a photograph or a drawing of the gift item. In another embodiment, the gift representation can be a written or typed name of the gift item and may further include a written or typed description of the gift item. The gift representations can be displayed as part of a list or other collection of gift representations.

The gift representation may be displayed on printed material or electronically. For example, the gift representation may be printed in a magazine, a catalog, a brochure, or other printed matter. In another example, the gift representation can be displayed as an electronic image or text on a website or in an e-mail.

The gift card or a plurality of gift cards, e.g., a multi-pack, can be delivered to the giftor who may select from among the gift cards (each of which may include a different gift representation) a gift item to be purchased for the giftee. The gift card or a package containing the plurality of gift cards can be delivered to the giftor by direct mail or obtained by the giftor at a retail store location. The gift card or package of gift cards can be delivered to the giftor upon the giftor's request or may be mailed or otherwise delivered to the giftor unsolicited. The gift representations appearing on each gift card can be printed, embossed, engraved, or stamped onto each gift card. In another embodiment, the gift representation can be printed on a stamp having an adhesive backing that can be affixed to the gift card. In embodiments in which a gift card package is provided to the giftor, the package may include a catalog that can contain a plurality of gift representations each of which is printed on a detachable stamp. The giftor can select one or more gift items by detaching the gift representation stamp for each selected gift item and attaching the stamp or stamps to one or more gift cards to be delivered by the giftor to the giftee.

The gift card system can also include a website having a graphical user interface (UI) that is accessible via a communications network such as, for example, the Internet. In other embodiments, the communications network can be a local area network (LAN), a wide area network (WAN), a global area network (GAN), an intranet, or another suitable communications network. The graphical user interface of the website can be capable of receiving information input or uploaded by a user of the website (such as, for example, the giftor or the giftee) and of transmitting the information to a server. The server can be a remote server. The server can include a processor for electronically manipulating the data transmitted to the server via the website. The server can also include a data storage device, which serves to store information submitted through the UI and transmitted by software of the website to the server via the communications network. Information submitted through the UI and website can include personal information of the giftor and giftee, credit card or other account information enabling the giftor or giftee to make a purchase, and photographs, images, audio files and video files permitting customization of the gift card or of a greeting card by the giftor.

In one embodiment, the website can include account management features that permit the giftor to transfer funds to the card issuer. The remote server connected to the global telecommunications network can be capable of storing funds data associated with the gift card. The funds data relate to the funds transferred by the giftor to the card issuer.

The website can include a dynamic button navigation system permitting the user to easily and quickly navigate the gift representations representing gift items that are displayed on the website. The dynamic button navigation system can also be used by the giftor or giftee to navigate between retailers whose products are available for purchase on the card issuer's website.

In one method, the giftor can send a physical or electronic gift card to the giftee by purchasing the gift item and ordering the gift card using the gift card system website.

In another method, where the giftor has received or obtained a physical gift card by direct mail or other delivery means, the giftor may activate the gift card by funding the gift card to purchase the gift item represented by the gift representation thereon using purchasing features on the gift card system website. The gift card can then be mailed by the giftor or otherwise delivered by the giftor to the giftee. The giftee can then activate the card by accessing the system website, providing identifying personal information or a code provided by the giftor, and using gift redemption features of the website to redeem the gift card for the gift or to select a different gift item than the one selected by the giftor. In this method, the giftor engages in a first (or purchase phase) activation of the gift card initially and the giftee engages in a second (or redemption phase) activation of the gift card to redeem the gift card for the gift item or for another item selected by the giftee.

In an exemplary embodiment of the gift card system, the gift card can include the unique card identifier. The unique card identifier may be a unique account or identification number (e.g., a series of alphanumeric characters such as a series of sixteen numbers), a unique bar code encoding a unique account or identification number, a chip storing and encoding a unique account or identification number, or another unique identifier that associates the gift card with an account of the user into which monetary funds have been deposited. The unique card identifier can also be associated with the user and the user's personal information.

In an exemplary embodiment, the unique card identifier can be a hexadecimal number, also known as a hexadecimal digit or hex number or any alphanumeric numbering system. The hexadecimal digit may be standard in that it may be represented by a combination of the numbers 0-9 and the letters A-F. The hexadecimal number may include a check digit that can be used to detect errors in the input of the hexadecimal digit, for example, where one digit of the hexadecimal number is mistyped.

The hexadecimal number can be used to identify the gift card, its original distribution method (e.g., direct mail or insertion into a publication), and the original giftee (i.e., the giftor). The hexadecimal number can also be used by the giftor to perform a first activation in which the gift card is activated and funded by the giftor. The gift card can then be delivered to the giftee in a gift card package. If the giftor is a new user, the website may prompt the giftor to register to create a new account before permitting the giftor to activate and fund the gift card.

Upon receipt of the gift card package, the giftee can access the system website and submit the same hexadecimal number to perform a second activation of the gift card that confirms receipt of the gift card by the correct intended recipient. During this second activation, the website may also provide the recipient with an option to send a printed or electronic "thank you" message to the giftor.

In an exemplary embodiment, the hexadecimal number can be used in connection with internet-based transactions and gift redemptions conducted through the system website. In another embodiment of the system, the hexadecimal number can be submitted through the website and converted by software to a printable document that can be used by the giftee at a brick-and-mortar retail location having a POS system. Once printed, the printable document, i.e., the printed gift card, can include a bar code in which a standard sixteen-digit gift card number is encoded that will be accepted by a POS terminal. In another embodiment, the printed gift card can include the printed standard gift card number and no bar code. The hexadecimal number can also be used by system software to identify the user accessing the website so as to customize the website based upon data available that is related to the specific user.

The hexadecimal number may be printed or otherwise notated on or in a source such as, for example, the gift card, which can be either a physical card, e.g., a gift card constructed from paper or plastic, or a virtual gift card or "e-gift card." Hexadecimal numbers may also be printed on or in any of numerous other sources including, without limitation, catalogs, newspaper advertisements, catalog and newspaper inserts, brochures, magazines, conventional greeting cards, and virtual greeting cards or "e-greeting cards."

Each hexadecimal number can be unique and may be used as a primary identification ("primary ID") for one or more items of information. For example, the primary ID can be a name, address, e-mail address, telephone number, facsimile number, publication name, publication issue date, publication volume, card issuer name, account number, or any other item of information that identifies a person, entity, or publication. Publications may include, for example, brochures, catalogs, magazines, newspapers, and advertising inserts.

Each hexadecimal number can also be used as a secondary identification ("secondary ID") for one or more items of information. For example, the secondary ID can be the name of a publisher or retailer, an effective date, an in-house date, a publication date, a date of transaction, a source of a mail list, a recipient's name, a recipient's address, a recipient's e-mail address, a specific product, a giftor's name, a giftor's address, a giftor's e-mail address, a type of transaction, or other information that can be used to identify the giftor, the recipient, the publisher, or the retailer.

In an exemplary embodiment, the source can be an e-gift card that may feature the name and address of a direct mail recipient of the e-gift card as the primary ID. The secondary ID can be one or more of the publisher, the retailer, the specific product, the publication date of the publication, the date of the transaction, and the type of transaction.

In another embodiment, the source can be a virtual greeting card that may feature the recipient's e-mail address as the primary ID. The secondary ID can be one or more of the giftor's e-mail address, specific product, publisher, retailer, date of transaction, and the type of transaction.

In another embodiment, the source can be a catalog such as, for example, a store catalog. The primary ID can be the name and address of the catalog recipient. The secondary ID can be one or more of the catalog publisher, retailer, in-house date, effective dates, the source of the mail list, specific product in the catalog, and recipient's e-mail address.

In another embodiment, the source can be a newspaper insert that may feature the issue date and publication volume as the primary ID. The secondary ID can be a specific product.

In another embodiment, the source can be a newspaper advertisement that may feature the issue date and publication volume as the primary ID. The secondary ID can be a specific product.

In another embodiment, the source can be a brochure and the primary ID can include the publication issue date and publication volume. The secondary ID can be one or more of a specific product, the publisher, the retailer of a specific product, the publication date, the effective date, the name and address of the brochure's recipient, and the recipient's e-mail address.

In still another embodiment, the source can be a magazine and the primary ID can be the magazine recipient's name and address. The secondary ID can be one or more of the magazine publisher, the in-house date, effective date, the source of the mail list, a specific product, and the recipient's e-mail address.

In yet another embodiment, the source can be a conventional gift card or conventional greeting card. The primary ID can be the card issuer and an account number. The secondary ID can be one or more of the recipient's e-mail address, a specific product, the date of transaction, and the type of transaction.

The hexadecimal number can be used in conjunction with one or more computer databases to track the purchasing habits of consumers including both giftors and giftees. The information obtained by the retailer, publisher, or advertiser using the tracking features can be used for predictive advertising in which related products are suggested to the giftor or to the giftee after a first product is purchased. For example, the system may use data related to a giftor's purchase of a birthday gift for a giftee during the previous year to recommend products or services for purchase by the giftor for the giftee's birthday during the current year. In one embodiment, the hexadecimal number can be used in connection with social networking websites such as, for example, Facebook™ or MySpace™, to obtain information and data pertaining to the users of the social networking website. The data and information obtained may relate to advertisements viewed within the social networking website by its users. This user data and information can be compiled in a computer database and linked to products or services that can be displayed in advertising targeted to and customized for specific individuals or groups of individuals.

In another embodiment, the unique identifier can be a stock keeping unit (SKU) where each product is assigned a separate and unique SKU. The SKU can be a universal SKU system that may be used to identify products by multiple retailers or manufacturers rather than a conventional SKU that uses digits assigned by each retailer or manufacturer using its own numbering system. The hexadecimal number can be used in place of the SKU or in combination with the SKU.

In one embodiment, a hexadecimal number appearing in a catalog or other publication, once entered into the system by the user using the system website, can be used by the system to identify the user and the publication, for example, where the publication is a subscription sent regularly to the user. The catalog can further include unique SKU's each of which identifies a unique retail item or service or gift item displayed in the catalog. The user can select a gift item or retail item or service for purchase by entering the item's associated SKU into the UI of the website. The system then directs the user to a web page of the website that provides information about the selected item as well as purchasing options.

The hexadecimal number associated with a gift item appearing in a publication can be entered into the website's UI by the user, which is then identified by the system and matched with the location or IP address of a specific web page on the retailer or card issuer's website that can display an image of the gift item and a description of the gift item. The system associates the hexadecimal number with the user so that the system can track, among other data, the user's history concerning publications read by the user, products viewed on the system website by the user, and products purchased through the system website by the user.

The gift card can be used by the giftor to make a monetary gift to the giftee that can be used to purchase goods or services from a specific retailer, manufacturer, or service provider, or, in one exemplary embodiment, to make a gift to the giftee that is a specific good sold or produced by a specific manufacturer or retailer or a specific service provided by a specific predetermined service provider.

For example, the gift card could be for a specific magazine subscription, a specific perfume, or a specific set of golf clubs. The gift card could also be redeemable for a service such as a manicure or trip to a day spa. The gift card may include a photograph or other image of the gift selected by the giftor for the giftee. The gift card may further include a web address for the card issuer's website where the giftee can redeem the gift card. The gift card can also feature the purchase price or fund amount of the card so that the giftee will know the amount of funds available to use for purchases made when redeeming the card. The gift card can be obtained by the giftor from a card issuer, who may be a retailer, manufacturer, advertiser, or a third party working on behalf of the retailer, manufacturer, or advertiser.

The gift card system also includes means for the giftor to deliver the gift card to the giftee. The delivery means can be a separate envelope into which the gift card can be inserted, an integrated gift card-envelope combination, or an email or other electronic or digital delivery means that can be viewed on a display monitor and/or printed by a printer connected to a computer.

The gift card may be a stored-value card that includes a magnetic strip to encode the card number and funds data. In an exemplary embodiment, funds data is the amount of money transferred to the card issuer by the giftor to fund the card. The funds data can be physically stored as data encoded on a magnetic strip of the gift card, however, in an exemplary embodiment, the funds data is stored on a remote server that is accessible via a global telecommunications network. The remote server can be maintained by an issuer of the card.

In one exemplary embodiment, the gift card can be a paper card. The paper gift card may be a closed-end mailer that includes a combined envelope to which the card is connected for mailing by the giftor to the giftee. The combined gift card and envelope can be a single unitary piece and may also include a separate brochure. The envelope may include a bar code to enable tracking by the card issuer of the individuals to whom each gift card is sent, particularly when the gift cards are distributed unsolicited inside magazines, attached to packaging, or by broadcast mass-mailings or emails. The brochure can be used to provide directions to the giftor concerning how to fund the gift card or directions to the giftee regarding how to redeem the card. In another embodiment, the brochure can include advertising information related to other products or services sold or provided by the card issuer, retailer, or manufacturer.

In another embodiment, the gift card may also include a portion that is a greeting card or, in another alternate embodiment, the gift card can be a greeting card that includes a unique card identifier, e.g., a hex number or a gift card number, that permits the card to be funded securely by the giftor and securely activated and redeemed by the intended recipient.

The paper gift card can be in the form of a coupon or as part of a packaged envelope, card, and advertising information that can be mass-distributed by mail either randomly or through targeted mailings to specific individuals or households. The coupon version of the gift card can include a card number to permit funding of the card by the giftor and activation of the card by the recipient at a retail location or online through the card issuer's website. The gift card can be used and delivered to a giftor as a stand-alone brochure, a package insert, or a direct mail piece. In another embodiment, the paper gift card can be inserted unattached or bound into a magazine, catalog, newspaper or other publication that is will be purchased or viewed by individuals of unknown identity. In still another embodiment, the gift card can be predictive in nature, for example, where the card issuer obtains information from retailers or another source related to an individual's contact information and shopping preferences to distribute the card to a targeted set of individuals.

The paper gift card can be connected to a tongue of an envelope that can be delivered via mail or other delivery means. The envelope can be oriented in an open configuration so that contents of the envelope such as, for example, the gift card, gift card instructions, a catalog, a brochure, or a greeting card, can be accessed by the recipient. The envelope can also be oriented in a closed configuration to enclose or seal the contents inside the envelope. The gift card can be detachably connected to an inner surface of the envelope's tongue by an adhesive. The gift card may comprise an affixed portion attached to the envelope tongue by the adhesive or other attachment means. The gift card and affixed portion may be separated by a perforation that permits the gift card to be detached from the affixed portion by tearing. The gift card can be sized and attached to the inner surface of the envelope tongue in such a way that a top edge of the gift card may extend further than and hang beneath a bottom edge of the envelope tongue. The gift card can be inserted into a pouch (or interior space) of the envelope when the envelope is oriented in the closed configuration. When the envelope tongue is grasped and opened by the giftor, the gift card is pulled out of the pouch of the envelope so as to be visible to the user.

The gift card may further include space to write or print the giftee's name. Once the giftor has detached the gift card from the affixed portion, the giftor may insert the gift card into the pouch of the envelope and then seal the envelope in a sealed configuration for delivery to the giftee.

In another embodiment, the gift card can be detachably connected to the envelope via perforations. The gift card can remain entirely or partially exposed outside of the envelope's pouch when the envelope is oriented in the closed configuration so as to be visible. When the envelope tongue is oriented in the closed configuration, the gift card can still be visible to the user because the gift card may protrude from and hang beneath a bottom edge of the envelope tongue. After the gift card has been activated and funded, the giftor can detach the gift card from the bottom edge of the envelope tongue and insert the card into the envelope which can be sealed in the closed configuration for delivery to the giftee.

In another embodiment, the envelope tongue can further include a detachable portion or stub connected to a bottom edge of the tongue. The detachable portion can include an image or description of the gift item purchased by the giftor and redeemable by the giftee using the gift card enclosed within the envelope. The detachable portion may be detached by the giftor and discarded or detached and retained by the giftor as a record of the gift item purchased for the giftee.

In one embodiment, the paper gift card can be attached to a box, for example, to the top of a pizza box, or to other packaging in which a product is delivered to consumers. The paper gift card can be attached to the box or other packaging by a magna-strip or other resins or glues, although any suitable attachment means may be used for the purpose. Magna-strips may also be utilized to attach the gift card inside, on, and to magazines and other publications.

In another embodiment, the gifting system may use a multi-pack, which can be a package or envelope containing multiple gift cards for a plurality of products or services or from a plurality of retailers or manufacturers. The multi-pack can be delivered to the consumer, e.g., by direct mail, so that the consumer can browse the gift cards and select one or more to activate and fund for gifting to a giftee. The giftor's opportunity to select one or more gift cards for activation and gifting to a giftee from among the plurality of gift cards contained by the multi-pack provides a type of "gift card mall" experience that is delivered directly to the giftor's home. The giftor can select a gift from among the gift representations provided in the multi-pack and activate and fund the gift card via the website from a location and computer that is convenient for the giftor. The multi-pack can be mailed to a consumer upon the consumer's request or can be mailed to a group of consumers whose contact information is obtained from a mailing list compiled or acquired by the card issuer or advertiser.

The multi-pack and the plurality of individually unique gift cards contained therein can be manufactured using a single stream in-line process, by a sheet-fed operation, manually, or by any other suitable printing and folding means. To efficiently create the multi-pack, a variable printing machine may be used to print unique cards sequentially via inkjet printing means. The sequential printing feature of the printer allows a single set of a plurality of unique gift cards, e.g., gift cards for a plurality of different gifts or from a plurality of different retailers or manufacturers, to be printed as one sequential set that can be packaged together rather than requiring printing and subsequent collation of the different cards. The gift cards can be variably printed so that each card differs in the name of the consumer, the gift representation, the retailer, or the manufacturer printed on each card in the set that is to be packaged. In this way, each consumer can receive a multi-pack that is individually personalized for the specific user and which can contain gift cards that are the same as or different from those contained in any other multi-pack. Personalization of each multi-pack for each specific user can be accomplished using personal information contained in a database related to each user. The printing machine can collate the cards automatically rather than requiring each set of identical gift cards to be separately printed and subsequently collated by manual or mechanical means. In one embodiment, the multi-pack may also contain one or more mailable greeting cards and envelopes in addition to the plurality of gift cards. In another embodiment, the multi-pack can be made available for pick-up by giftors in a retail location. Each gift card in the multi-pack may include a unique hexadecimal number, standard gift card number, and/or bar code printed thereon. Other information can also be printed on each unique gift card within the multi-pack to further personalize the gift card such as, for example, the giftor's name and address, the product name or product image, and product information. Similar personalized data can be printed on the greeting card in embodiments in which the multi-pack contains one or more greeting cards.

In another exemplary embodiment, the gift card can be digital or electronic. For example, the gift card may take the form of an email that includes a unique card identifier. The email may be printable so that once sent by the giftor to the giftee, the giftee may receive, print, and use the gift card to make a purchase. The electronic gift card may be designed by the giftor using design features available on the website. For example, the website may permit the giftor to include a photograph of the giftor on the gift card.

The invention also features a method in which a giftor creates and logs into an account on a card issuer's website and accesses account features on the website that enable the giftor to order, personalize, fund, address, and send a personalized gift card to a giftee. Once the gift card has been purchased, the website may generate a receipt, which can be an animation, to notify the giftor that the purchase transaction has been completed and that the gift card will be delivered to the giftee. The receipt may be delivered to the giftor in an email. Upon receipt of the gift card, which may be a printed paper gift card that is mailed or otherwise delivered or an electronic gift card (or e-gift card or e-card) that is emailed or otherwise electronically transmitted to the giftee, the giftee can redeem the gift card by accessing the card issuer's website and following instructions provided therein to activate the card. In another embodiment, the giftee can activate the card via a telephone system of the card issuer.

In embodiments utilizing the e-gift card, the e-gift card may include a link to an advertisement for the gift item or for other products or services sold by the gift item's retailer. In another embodiment, the advertisement may be attached to the e-gift card as a separate file, which can be a multimedia file.

The giftor may register for access to the website, and once registration is completed, may receive a log-in or username as well as a personal identification number (pin) or password to access the website. Personal information entered by the giftor during registration can be saved on a remote server maintained or controlled by the card issuer. The giftor may choose a gift to be purchased and given to the giftee as a gift card that can be redeemed online or at a retail store. To send a gift card to the giftee, the giftor must enter predetermined personal information related to the giftee, which can also be stored on the remote server. The website may generate a password that can be provided to the giftee to activate the gift card online, by telephone, or at a retail store to redeem the gift card for the gift. In another embodiment, users can access the website without being required to use a password.

In another embodiment, the method includes a step wherein the giftee must also register for access to the website, thereby providing certain predetermined personal information, to activate the gift card. Once the giftee has registered and logged in to the website, the giftee may activate the card to redeem the gift. If the giftee accepts the gift, acceptance confirmation may be provided. Shipping confirmation may also be provided via the website, email, or mail where the gift is to be shipped to the giftee rather than received at a retail store.

The website may include an avatar created from software that generates a human voice to orally describe the products being advertised, provide instructions, greet the individual accessing the website, provide gift card delivery status, or provide information pertaining to points or rewards earned through use of the card issuer's website. The avatar and its related software can provide dynamic personalization to user account accessible via the website by communicatively linking the avatar software to a database stored on a server. The database can include user information such as, for example, the user's name, address, birth date, anniversary date, and other personal information that is associated specifically with the user. The system can include text-to-speech software that converts text entered into the system and preselected user information obtained by the avatar software from the database into an audio file that sounds similar to or mimics a human voice. The avatar's speech can include reading or playing aloud the website user's name as part of a greeting message to the user. In another example, the audio file which appears to be spoken by the avatar can include a birthday greeting message on or around the time of the user's birth date.

In one embodiment, the system may use data related to the user's shopping interests and previous purchases to suggest gifts through information "read" aloud by the avatar. For example, if the user/giftor is shopping on or around the time of Mother's Day, the system by means of the avatar speech can recommend a gift to the giftor similar to the gift that the giftor purchased for the giftee the previous year. In another embodiment, the system's avatar may recommend a variety of gifts for purchase by the giftor which are appropriate for the occasion. For example, if the giftor is shopping on the website for a female giftee's birthday gift, the avatar may "read" descriptions of one or more gift items such as, for example, jewelry or women's perfume. In this way, the appearance and content of the website's web pages and content can be customized to be predictive based upon the user's history and habits recorded by the system during the user's previous visits to the website.

If the giftor has selected a particular gift for the giftee, which can be indicated in information provided on the gift card, and if the giftee desires a different gift than the one selected by the giftor, the giftee may choose a different gift of the same or a lesser value by accessing the card issuer's website and following instructions provided therein for changing the gift selection.

In another embodiment where the card issuer is a brick-and-mortar retailer, the giftee may redeem the card to receive the gift by visiting one of the retailer's store locations.

The invention also relates to a method for gifting and advertising. In one step of the method, when the giftee accesses the card issuer's website to activate the gift card, the giftee will have the option to send a thank you message, which can be delivered via email, to the giftor.

In one embodiment of the method, the website may be customized to have a different appearance or to contain different content, for example, advertising content, for each giftor and giftee that accesses the website. Advertisements on the website can be linked or hosted.

The invention also relates to a method of gifting that can include the use of a unique card identifier that can be an alphanumeric identifier such as, for example, a hexadecimal number, stock keeping unit (SKU), or standard gift card number (e.g., a standard sixteen-digit gift card number), or the unique card identifier can be a bar code having any of the aforementioned identifiers encoded thereon. The method can include the step of providing a printed material including a plurality of gift representations each representing an actual gift item. A unique printed alphanumeric identifier stored on a server can be assigned to each of the plurality of gift items represented by the plurality of gift representations. The method can be used to associate tracking data with each alphanumeric identifier. The method can also provide a website that is connected to the server via a communications network by which a user can purchase at least one gift item selected from among the plurality of gift representations appearing in the printed material. The user can be required to enter the alphanumeric identifier assigned to the selected gift item into a graphical user interface of the website. The method can also require the user to provide personal information through the graphical user interface of the website. The alphanumeric identifier can be associated with the user, e.g., in a database in which alphanumeric identifiers are each associated with one of a plurality of users.

Where a hexadecimal number or SKU is used, the method may include the step of converting the alphanumeric identifier into a standard sixteen-digit gift card number that is acceptable at POS terminals in retail locations.

The method can also include the step of analyzing the tracking data, personal information, browsing habits, and shopping habits of the user collected during the user's access to the website to determine the user's predicted shopping preferences. Advertisements may be presented to the user based upon the user's predicted shopping preferences.

The method may include the step of purchasing a gift item through the website to be gifted by the user to a giftee, wherein the user is a giftor. Another step of the method can include delivering a gift card to the giftee. The gift card can feature a gift representation of the actual gift item selected and purchased by the giftor. The gift card may be redeemed for the actual gift item by the giftee providing the giftee's personal information through the graphical user interface of the website.

The method can be used to record data related to the shopping and purchasing activities of the giftor and giftee accessing the website. Using the recorded data, gift items can be suggested to the giftor for purchase by the giftor during the giftor's subsequent visits to the website based upon the giftor's shopping and purchasing activity data during previous visits to the website. The giftee may redeem the gift card for the gift item selected and purchased for the giftee by the giftor. Alternatively, the giftee may reject the gift item selected and purchased by the giftor and to select a different gift item chosen by the giftee.

The invention also relates to a method that can be used to advertise and promote retail goods and services through gifting. Once the user, e.g., a consumer, a giftor or a giftee, has accessed the system website, the user may elect to play and view an advertisement, which features information related to a retail item. The retail item can be a good or a service. Through the website, the user can then be asked or presented with a series of questions related to the retail item. The user can be awarded points based upon the number of questions answered correctly by the user. The user may then redeem the points awarded by the system for a reward item. The reward item can be a downloadable movie, a downloadable song file, a downloadable audiobook, a pay-per-view movie, a downloadable image file, a downloadable computer screen saver, a downloadable video file, or a movie rental voucher. The method can permit a giftor to gift points earned or a reward item selected by the giftor to a giftee.

In another step of the method, when giftors and giftees access the card issuer's website they may be shown advertisements and other marketing information provided by the card issuer, retailers, and/or manufacturers. The advertising information may be provided as video and/or audio presentations, still photographs, and/or text advertisements. The advertising information can also be provided through games in which the giftor or giftee answers questions to earn points that are redeemable for rewards. Where the website is operated by a third party and not by one or more retailers or manufacturers, the retailer and/or manufacturer may pay for the rewards earned by users of the website. The questions on the website may be directed to information about the retailer and/or manufacturer's products. Consumers can be rewarded or paid to watch advertisements. A consumer may earn reward points by watching advertisements on the website and answering questions about each advertisement correctly. The consumer may also be awarded points for making purchases through the website including gift card purchases. The number of points awarded may also be dependent upon another variable such as the number of seconds of advertising watched while the giftor or giftee is accessing the website. Examples of rewards that may be earned through the game-like advertising on the website include streaming and downloadable movies that can be viewed online, pay-per-view movie credits, music downloads, gas credits, or any other suitable product or service. In one embodiment, the interactive gifting system permits the consumer to select the advertisements that he or she watches.

The method can include the step of using the system to record the number of correct and incorrect answers provided by the consumer. Other information such as, for example, information concerning the specific questions answered correctly or incorrectly by the consumer can also be recorded. In this way, more points may be awarded to the consumer for answering certain questions correctly than other questions. Because the method incorporates these data mining features that are recorded in association with the identity and personal information of a specific consumer, advertisers can receive more viable and valuable leads related to individuals to whom the advertiser should target its advertisements and promotions.

The method and systems related thereto are viral in that one consumer can refer another consumer to the website for the system. In one example, the referral is accomplished by a giftor delivering a gift card to a giftee so that the giftee is directed to the website by instructions included with the gift card in order to redeem the gift. Once the giftee accesses the website, in addition to redeeming the gift card for a gift item, the giftee may also engage in game play of a commercial game, e.g., watching advertisements on the website and answering questions concerning those advertisements to earn reward points that are redeemable for a retail good or service. The method can also include steps in which a first consumer refers a second consumer to the website by emailing a link to the website, by word-of-mouth, or by submitting the second consumer's e-mail address or other contact information through the website to allow the system to generate an e-mail, direct mail, or other communication to the second consumer with information related to the game and reward point system.

Multi-Purpose Forms

As described herein, the gift card can include a form that features a single sheet having detachable portions. This invention can relate to a multi-purpose form that includes at least two detachable components, which can be customized by a user. The user can be an individual, e.g., a consumer, a person who is a giftor or a giftee, a commercial printer, educational or institutional user, a business user, a service bureau that prints or imprints and creates greeting cards or gift cards for consumers, or any other person or entity that has a personal or commercial need to use the multi-purpose form. The invention also relates to methods for using the multi-purpose form and methods for gift giving and sending correspondence. The multi-purpose form can feature a single sheet or two or more sheets, and each sheet will include at least one detachable component. In exemplary embodiments, each sheet includes at least two detachable components. As shown in FIGS. 1-4, the detachable components of the multi-purpose form include at least a correspondence piece 14 and a scrip 16. In exemplary embodiments, such as those shown in FIGS. 5-8, the detachable components also include an envelope.

In other embodiments, the sheet can include only a single sheet with a single detachable component that is an envelope piece 18. The envelope piece 18 can be a flat, planar piece that includes a plurality of leafs 36, 42, 44, 46 (e.g., five or more leafs) and adhesive areas 20, 38 for folding and assembling the envelope piece 18 into an envelope. The assembled envelope can include a lid 36, three close sides, one open side, and a pocket. In another embodiment, the sheet can include two or more plies of material and the detachable component can be a fully assembled envelope that is detachable from the sheet. In this embodiment, an envelope pocket can be formed in a space between two plies which may be adhered together on three sides and open on a fourth side.

The sheets can be formed from a single ply of material such as, for example, paper. In an exemplary embodiment, each sheet can be formed from two plies of material. In other embodiments, one or more of the sheets can be formed from more than two plies of material. When multiple plies of material are used to create the sheet, the plies may be sandwiched and attached securely together using an adhesive. In an exemplary embodiment, the sheet includes two plies that are adhered together only around the perimeter of the sheet or around the perimeter of one or more particular detachable components such as, for example, around a perimeter of the envelope. Each ply can be made from the same material or each ply can be made of a different material. For example, in a two-ply embodiment, a first ply can be constructed paper and a second ply from plastic. In another example, a three-ply sheet can include a first ply made from paper, a second ply made from plastic, and a third ply made from foil. In embodiments in which the sheet includes multiple plies, each ply may be pre-printed during manufacturing on a printing press or other printing means with text, graphics, images, or other information that is not visible on interior surfaces once the plies are adhered together. When the detachable components are removed from the sheet, the plies may be opened or folded open by the giftor or giftee to reveal the text, graphics, images or other information that was formerly concealed by the adhesion of the plies together. Once detached from the sheet, the multiple plies can each be assembled into a page of a single greeting card or a gift card. The plies (or pages) can be sealed with an adhesive or open.

Each sheet of the multi-purpose form features a first surface, a second surface, a top edge, a bottom edge, and two side edges. The first surface can be a front surface and the second surface can be a rear surface, or vice versa. Each sheet of the multi-purpose form can include perforations, scores, slits, die cuts and any type of adhesive that allows the user to fasten parts of the detachable components together after their separation from the multi-purpose form and from one another. Each sheet can feature pre-printed information printed on the first surface, on the second surface, or on both. The pre-printed information can also be printed on the detachable components, which form part of the first and second surfaces. In an exemplary embodiment, the detachable components can include customizable spaces on which a user may imprint or affix the user's own customizations. Such customizations can include at least one imprinted, written, drawn, embossed, or affixed item such as, for example, text, an image, a symbol, a label, and a stamp. The customizations can be selected using software that can be provided with or separate from the multi-purpose form and installed on a computer or using software that is accessible via a website available on the Internet or another communications network. The user may select from among stock customizations provided by the software manufacturer or website operator, or the user may choose to use custom content provided by the user to create the customizations that can be imprinted on the customizable spaces of the sheet using a printer.

In an exemplary embodiment, each multi-purpose form may include a form identification number 12 that uniquely identifies that form. For example, all multi-purpose forms of an identical type (e.g., identical size, shape, material, structure, or layout and orientation of detachable components) can have the same form identification number 12 printed on each sheet of that multi-purpose form set. In one embodiment, each sheet of the multi-purpose form can feature a separate and unique form identification number 12. For example, if a multi-purpose form includes two sheets, e.g., a first sheet and a second sheet, among a plurality of identical multi-purpose forms, all exemplars of the first sheet of the multi-purpose form can have a first form identification number (i.e., the same first form identification number is printed on each first sheet) and all exemplars of the second sheet of the multi-purpose form can have a second form identification number (i.e., the same second form identification number is printed on each second sheet). The form identification number 12 can identify each type of multi-purpose form, its size, and the format or layout and size of the detachable components included on each sheet of the multi-purpose form. Each type of multi-purpose form can include a plurality or set of multi-purpose forms all of which are identical in size, shape, orientation, material, construction, and format or layout and shape and size of their detachable components. In another embodiment, the form identification number 12 can identify each unique, individual multi-purpose form, its size, and the format or layout and size of the detachable components included on each sheet of the multi-purpose form. The form identification number 12 can be printed on a frame 22 (as described below), in embodiments of the multi-purpose form that include a frame, or on one or more of the detachable components.

In another embodiment, the form identification number 12 can be printed on the form or encoded on the form in a magnetic stripe, embedded microchip, bar code, quick response (QR) code, alphanumeric number, or hexadecimal number.

The software, whether installed on a computer, e.g., the user's computer, or accessed through a website, can include a field in which the form identification number can be entered and submitted. Once submitted, the software can recognize the multi-purpose form on which the user intends to imprint. The software can optimize the printer's print settings such as, for example, paper size, margins, and location and orientation of customizable spaces on each sheet of the multi-purpose form, based upon the user's input of the correct form identification number as printed on the sheet being imprinted on by the user. In this way, the printer can position or configure print heads or other printing mechanisms so that imprinting of the customizations selected by the user occurs within a perimeter or boundary of each detachable component and in an appropriate field, position, orientation, and location on each detachable component.

In another exemplary embodiment, the website can be used to collect and compile one or more databases of personal information related to the users of the website. The website or software can also be used to collect and compile one or more databases of personal information related to the gift recipients (or giftees) who have received gifts from gift givers (or giftors). Personal information can include name, address, telephone number, e-mail address, other contact information (e.g., facsimile number, pager number, online messenger screen name, social networking website screen name, and any other information that allows a person to be contacted or communicated with by another), date of birth, anniversary date, these types of information related to the user's contacts (e.g., the user's spouse, children, grandchildren, parents, siblings, other relatives, fiancé or fiancée, and friends) and the user's shopping habits and preferences related to personal purchases and purchases intended as gifts. In embodiments in which the software is installed on a computer, the software may collect information that can be transmitted via an Internet or other communications network connection to a remote server for addition to and compilation in a database.

When the website or a software program is used to collect and compile personal information into databases, every multi-purpose form produced may include its own unique form identification number. The website and software can include online or computer-based versions of each multi-purpose form that can be viewed on a computer screen or monitor, populated with information and images, and imprinted by the user using a printer. (For purposes of convenience only and not by way of introducing any limitation, the remainder of the description of this particular embodiment of the invention is described with reference to the entry and transmission of the form identification number into and through a website, although it should be noted that software installed on a computer having an Internet or other communications network connection may also be used in this embodiment in place of or in conjunction with a website. All of the features and tools described herein in relation to the website and its software can also be included with and implemented by the software program that is installable on a computer.) A user can locate and read the unique form identification number pre-printed on a particular multi-purpose form and type or otherwise enter that unique form identification number into a data field of the website. The website transmits the unique form identification number to a remote server where the software is installed and the software locates personal information related to the user on the database. The website uses the software to access the database to collect personal information stored therein related to the user. The user can also access the website provider's library of images including, for example, photographs, computer-generated images, animations with or without uploaded and/or editable photographs, artwork, drawings, paintings, and other electronic or digital images, to select stock images for use in customizing the multi-purpose form with which the user is then working. Alternatively, as described herein, the user may select and upload the user's own images for imprinting as customizations onto the customizable spaces of the detachable components.

Once the user has entered the unique form identification number of the particular multi-purpose form being used into the website, the website's software can access the remote database, collect the user's stored personal information from the database, and populate certain fields of the multi-purpose form with the user's information. For example, the website and its software may populate any fields of the online version of the multi-purpose form with the user's name, address and other contact information or with the name, address, and date of birth of the giftee. In another example, the website and its software may populate the fields of the multi-purpose form's online version with personal information obtained from an e-card, virtual greeting card, or animated e-card that the user has previously created or that the user is creating simultaneously with the multi-purpose form using the website. The website's software can process the personal information to arrange it in the online version of the multi-purpose form to match the specific format of the multi-purpose form having the form identification number entered and submitted by the user into and through the website. Using a personal, desktop, or other printer, the user can then imprint the multi-purpose form populated with text, images, and other data or information selected by the user and populated into appropriate fields and locations on the online version of the multi-purpose form. The website may also use the unique form identification number to populate fields and locations to be imprinted by the printer on the multi-purpose form without first creating an online version of the multi-purpose form that is viewable on the computer monitor. After the multi-purpose form, or each sheet of the multi-purpose form, has been imprinted, the detachable components that require further assembly (e.g., the envelope piece and the correspondence piece) can be detached from each sheet and assembled.

In another embodiment, the multi-purpose form's detachable components may be pre-printed with photographs, images, symbols, text, or other printable content such as a theme (e.g., birthday or holiday-related graphics) that corresponds or is identical or similar to existing computer-generated graphics or animations on the virtual e-card. Once the user enters the multi-purpose form's unique form identification number 12 into the website, the website can prompt the user to enter the user's personalized and customized date or information into a virtual e-card, which in some embodiments can feature an animation. In this manner the multi-purpose form and its form identification number 12 are used to create a virtual-card from the user for the giftee.

Personal information related to the user or to the user's relatives, friends, and acquaintances can be obtained through the website and then be used to populate or customize the customizable spaces of the detachable components and of computer-generated customizable spaces on computer-generated versions of the multi-purpose form that are viewable on a computer's display screen.

For example, the user can visit the website using a computer with a browser software program and an Internet connection or a connection to another communications network. The user can create an account through the website, which account may include a login or screen name and a password. The website can require that the user submit personal information, e.g., name, address, date of birth, etc., in order to register the account to use services provided through the website. After the user has created an account, the user may log in to the website. In addition to using the website to customize the multi-purpose form for imprinting by the printer and for funding the scrip, the website may also permit the user to select a vendor name (e.g., a retailer or a manufacturer) for the gift that is to be given to the giftee. The software program of the website can be programmed to add the vendor's name, logo, product information, or other information related to the vendor to one of the computer-generated customizable spaces of the computer-generated multi-purpose form, which can then be imprinted on the customizable spaces of the multi-purpose form. In another embodiment, the vendor's name, logo, product information, or other information related to the vendor to a virtual e-card that can be generated by the software of the website. The virtual e-card can be delivered to the recipient by electronic means such as via attachment to an e-mail or by access through a link to a website, the link being insertable into an e-mail sent to the recipient. The virtual e-card may be animated in that it can include cartoons or other animations created as GIF, Flash, MPEG, or any other type of animation file. Personal information related to the user or to the recipient may be collected from the user as the user creates a virtual e-card, even when the user is using the website to create only a virtual e-card and not for imprinting one of the multi-purpose forms of this invention. In this way, the website can be used to compile personal information in the aforementioned database. The user can also use the website to provide payment information, e.g., the user's credit card, debit card, or checking account number, to fund the scrip where the scrip is a gift card or a gift certificate. The user can enter a user-selected dollar amount that can be deducted from or charged to the user's other bank or credit accounts to fund the scrip.

As a security feature, the website can be used to register the scrip for use and redemption only by the giftee intended by the giftor rather than by any bearer of the scrip.

As explained above, the user can use the website and databases or libraries of data such as, for example, images, symbols, photographs, and text, to select data to be added to the virtual e-card to customize it according to the user's preferences. The user can also use an upload feature of the website to upload data saved locally on the user's computer or on a server or computer of a connected communications network to be used in customizing the virtual e-card. The website can also provide a plurality of virtual e-card designs and themes from among which the user may select a virtual e-card that meets the user's preferences, that is appropriate for sending to the recipient on a certain occasion (e.g., on a particular holiday, or on the recipient's birthday or anniversary), or that the use knows or believes would be liked or appreciated by the recipient. The website may also permit the user to select the virtual e-card's animation, if any, from among a plurality of animations available through the website. The user can further personalize the virtual e-card by typing a personalized message to the recipient that appears in a text field of the virtual e-card. In one embodiment, the user can select a message for the recipient to be added to the virtual e-card from among a plurality of messages made available for selection on the website. Further customizations such as selecting the color, typeface, or font used on the virtual e-card are also possible.

Concerning the upload of data described above, the user can upload photographs or other images to the website for addition to the virtual e-card as customizations.

In one embodiment, the user can select a photograph from the website's database or may upload a photograph to the website from a computer or communications network and use a photo editing tool included in the software of the website to create an editable space within the photograph. The original image of the photograph in the editable space may appear as a blank area in the photograph or the editable space may appear as a silhouetted area so that the original image is visible to the user as if it is positioned beneath the editable space. For example, the color, contrast, and brightness of the original image may be decreased or muted in the area of the editable image in the photograph. Using the photo editing tool of the website's software, the user can select the size, shape, orientation, and location of the editable space in or on the photograph. The website's software may also permit the user to create more than one editable space within a single photograph. In one embodiment, the software may automatically recognize human faces appearing in an uploaded photograph and automatically create editable spaces over each face.

Once an editable space has been created, the photo editing tool may be used to crop the original image in the editable space out of the photograph. The photo editing tool may also permit the original image in the editable space to be rotated or changed in, for example, size, orientation, color, contrast, brightness, or any other dimension, quality, characteristic, or feature related to images and photographic images. In one embodiment, the photo editing tool can be used to resize and rotate the original image within the editable space. For example, a face appearing in the original image can be rotated within the editable space of the photograph using the photo editing tool. In another embodiment, the user may upload and add a second photograph that can be inserted into the editable space, thereby altering the appearance of the original photograph and replacing the original image appearing in the editable space. For example, the user may create an editable space over a first human face appearing in a first photograph (e.g., a stock image in the website's connected databases, or an image uploaded by the user to the website) and can upload a second photograph featuring a second human face that may be positioned in a layer behind the first photograph. The second human face can be the user's face, the recipient's face, or another person or animal's face. In this manner, the user can replace the first face in the first photograph by positioning the second face of the second photograph into the editable space of the first photograph. Animated virtual e-cards can also be created using photographs and other images in a like manner. The user's customizations to the editable space can also be imprinted on corresponding detachable components of the multi-purpose form. For example, the multi-purpose form may include detachable components in which photographs, e.g., face photographs, can be imprinted, detached, and affixed via an adhesive or other fastening means (tape, glue, staple, clip, or other suitable fastener) to another of the detachable components, e.g., to the correspondence piece.

The website may feature audio and video instructions as well as text instructions to instruct the user how to create the virtual e-card, how to create, imprint and assemble the multi-purpose form and its detachable components, or both.

Once the user has completed customization of the virtual e-card, the virtual e-card can be electronically transmitted via e-mail or other means over a communications network to the recipient. The user can input the form identification number 12 printed on a multi-purpose form of the invention so that the website and its software can imprint the data of the virtual e-card's user-selected customizations onto one or more specific positions on the multi-purpose form and its detachable components. The software of the website can automatically format the virtual e-card's customizations that were selected by the user for imprinting on the multi-purpose form and its detachable components based upon matching the form identification number 12 of the multi-purpose form entered into the website by the user with that multi-purpose form's known programmed formatting criteria, e.g., dimensions, orientation, material, construction, and layout, shape and size of its detachable components. The software of the website can also use the entered form identification number 12 to determine whether the multi-purpose form being imprinted by the user requires imprinting on only one side or on both sides. After the multi-purpose form is imprinted with customizations corresponding to those matching the customizations selected by the user in creating the virtual e-card, the detachable components of the multi-purpose form can be separated and assembled, where necessary, by folding, gluing, and inserting techniques. The assembled detachable components can then be mailed or otherwise physically delivered by the user to the recipient.

In another use, after receiving the envelope containing the correspondence piece and scrip, the giftee can locate the form identification number 12 printed on one or more of the detachable components In one example, the correspondence piece can include a pre-printed scene that includes one or more human figures. The faces of each human figure can be omitted and replaced with customizable spaces. The user may then select a photo belonging to the user to imprint on the customizable space of correspondence piece. In this way, the user could imprint the user's face, the giftee's face, a third person's face, or another photograph or image in the customizable space of the pre-printed scene.

In another example, the detachable components can include one or more customizable components onto which the user may imprint a photograph, image, or symbol. The customizable component may include an adhesive on a rear surface. The customizable component, e.g., a photograph of a person's face, can be detached and affixed to the correspondence piece or to one of the other detachable components as part of the user's customizations of those components of the multi-purpose form. In another embodiment, the detachable components can feature one or more customizable components on which photographs can be imprinted. These detachable customizable components can be, for example, wallet-size photographs that can be detached and inserted into a wallet.

In one embodiment, the customizations can be imprinted on one or more separate customization pieces that are detachable components. The customization piece can feature an adhesive backing that permits it to be removed from the sheet after imprinting and attached as a label or sticker over a portion of one of the other detachable components such as, for example, the greeting card. In one example, the user can imprint a photograph, e.g., a face, on the front non-adhesive surface of the customization piece. The imprinted customization piece can be removed from the sheet and affixed onto and over a corresponding similarly shaped and sized customization space on the correspondence piece. For example, a face photograph could be imprinted on the customization piece and removed by the user from the sheet to be affixed over a face or head area constituting a customizable space above an image of a human figure's body pre-printed on the correspondence piece. Customizable pieces can also be imprinted and affixed to the envelope or scrip.

Adhesives used in this invention can be pressure-sensitive, fugitive, remoistenable, or any glue that is suitable for attaching portions of the form together after imprinting. The multi-purpose forms can be manufactured and printed using a printing press and finishing equipment as described herein. Finishing equipment can be used during manufacturing to vary the size or shape of each sheet or each detachable component included on each form in a package of multi-purpose forms. The sheets of the invention can be collected in stacks of individual sheets, rolls of sheets, or accordion forms, e.g., fan-folded accordion forms, with or without sprocket holes or other elements that may or may not be needed, to feed the sheet through a printer, printing press, or other suitable printing device. Each sheet can include a plurality of identical multi-purpose forms, a plurality of different multi-purpose forms, or a plurality of multi-purpose forms some of which are identical and some of which are different.

The detachable components can be detached from the sheet by tearing, ripping, or cutting along lines of separation 26 between each detachable component or between each detachable component and a frame 22. The lines of separation 26 can be fold lines, score lines, or printed dashed or dotted lines. In an exemplary embodiment, the lines of separation 26 can be perforations. In a most exemplary embodiment, the lines of separation 26 can be microperforations.

The sheets of the multi-purpose form can be manufactured from any material that can be fed through a printer and which has a surface on which the printer may print. Suitable materials can include paper, plastic, metallic or semi-metallic foil, and paperboard. The material can be of any weight, thickness, or stiffness or rigidity as long as the material is sufficiently flexible to be moved mechanically through the printer. The material can also be any size or shape that can be received by and fed through the printer. In exemplary embodiments, the material can be 8.5 inches by 11 inches (letter size), 8.5 inches by 14 inches (legal size), 11 inches by 17 inches, 11 inches by 25.5 inches, 14 inches by 25.5 inches, or A4. Large paper sizes can include perforations or lines of separation that can be used to separate the sheet of paper into two or more pieces that can be fed through the printer. In this way, if a printer capable of receiving an 11 inches by 17 inches sheet of paper is not available to the user, the multi-purpose form can include, for example, centerline perforations that can be used to separate the sheet of paper into two letter size sheets, thereby allowing the user to imprint the multi-purpose form using the printing device that is available. In another embodiment, a multi-purpose form that is 11 inches by 25.5 inches in size can include perforations or lines of separation that permit the user to separate it into three letter size sheets for imprinting. In still another embodiment, a multi-purpose form that is 14 inches by 25.5 inches in size can include perforations or lines of separation that permit the user to separate it into three legal size sheets for imprinting.

The printer used with this invention can be any printing device capable of receiving and feeding the sheets of the multi-purpose form therethrough. For example, the printer can be a home or office printer, such as, for example, a personal printer or desktop printer, or a larger stand-alone multifunction printer such as the types commonly found in offices. The printer can also be an inkjet printer, a laser printer, a wide format plotter, a copy machine, a litho printer, or any other suitable type of printer. The printer can be a standard printing press, a digital printing device or a variable printing device. Because the multi-purpose form is contemplated to be commonly used by consumers at home, the multi-purpose form and software used therewith may be optimized for use with desktop printers. The printer may be of a type capable of printing on only a single side of a sheet or on both sides of a sheet of the multi-purpose form. The multi-purpose forms can also be imprinted with customizations on a digital printing press or any other type of printer so that the user can imprint customizations thereon using a printer that is available to the user.

Printing and imprinting can occur in stages (also described as instances herein). In a first stage, information can be printed on a multi-purpose form by the manufacturer during or after manufacturing of the form. In a second stage, information can be imprinted on the multi-purpose form by a user, e.g., a giftor. In a third stage, additional information can be imprinted on the multi-purpose form by another user, e.g., a giftee. A giftee (or gift recipient) may have a need to imprint additional information on the multi-purpose form after receiving it from the giftor. For example, while activating the scrip using the website described herein, the giftee may be given the option to enter a contest. If the giftee wins the contest, the website may require, or the giftee may desire, that additional information (e.g., information related to a contest prize) be imprinted on the multi-purpose form during the third stage of imprinting.

In an exemplary embodiment, the correspondence piece 14 can be a greeting card. The greeting card can feature two leafs 28 that can be folded together along a fold line 30. In other embodiments, the greeting card can feature three, four or more leafs and multiple fold lines for folding the card together once the correspondence piece is detached from the sheet. In another embodiment, the correspondence piece can be a post card.

In an exemplary embodiment, the scrip 16 is a gift card. In other embodiments, the scrip 16 can be a gift certificate or a coupon. The scrip 16 can be any non-monetary certificate that is redeemable for currency, goods, or services of value. Currency can include official currency (e.g., the United States dollar) or loyalty or rewards points accumulated by a user through use of a website or other shopping service. The scrip 16 can be two-dimensional or flat, and generally, does not require folding or other assembly after being detached from the sheet. The scrip 16 can feature one or more identifiers on which or by which data related to the user (i.e., giftor), the giftee, the retailer, the manufacturer, the card issuer, the bank, the funds loaded on the card or contributed to the card account, and the goods or services selected as a gift may be encoded. Suitable identifiers include magnetic stripes, embedded microchips, bar codes, quick response (QR) codes, gift card numbers, alphanumeric numbers, and hexadecimal numbers. Retailers, manufacturer, banks, card issuers, and card processors can use the information encoded on or by the identifier to authorize and reconcile the purchase made using the scrip 16. Information encoded on or by the scrip may also be used by the retailer, manufacturer, bank, card issuer, and card processor to track the shopping habits and preferences of consumers, and particularly, where the scrip is used by the giftor and giftee in conjunction with an online shopping website that can be part of this invention.

In one embodiment, the scrip 16 can include adhesive on at least one surface for use in attaching the scrip 16 to another of the detachable components, e.g., to the envelope or to the correspondence piece 14. The adhesive can be remoistenable glue, pressure-sensitive glue, or any other adhesive that is suitable for attaching the material of the scrip 16 to the material of one of the other detachable components. In another embodiment, the scrip 16 can be secured to one of the detachable components by inserting two or more of its corners into slots 34 or holes cut into the detachable component. For example, where the correspondence piece 14 is a foldable two-leaf greeting card, the correspondence piece 14 can include four slots cut into an inner surface of one of the leafs and positioned so as to receive each of the four corners of the scrip 16 where the scrip 16 is a gift card.

Each sheet of the multi-purpose form can also include a frame 22 to which the at least two detachable components are attached. The detachable components are detachable from the frame 22. In embodiments in which the multi-purpose form does not include a frame 22, the detachable components can be connected to and detachable from one another. The frame 22 can be blank or it may include colored, e.g., gray, areas to assist the user in identifying which portions to remove from around the detachable components. The frame 22 can also feature directions or symbols instructing the user as to the orientation of the surface and edge of the sheet that must first be loaded into the printer for imprinting the user's customizations onto the sheet. After the imprinting of customizations on one surface of the sheet has been completed, the software or printer may notify or instruct the user to remove the imprinted sheet and to orient and insert it into the printer again for imprinting of the customizations, if any, selected by the user for the reverse surface of the sheet. In other embodiments, the detachable components can form the entire sheet and no frame 22 may be included in the multi-purpose form.

The detachable components can further include an envelope piece 18. In embodiments of the multi-purpose form that include a frame 22, the envelope piece 18 can be detachable from the frame 22. In embodiments of the multi-purpose form that do not include a frame 22, the envelope piece 18 can be detachable from the other detachable components. In some embodiments, the envelope piece 18 may be formed from an entire sheet of the multi-purpose form. The envelope piece 18 can also be a part of the sheet that includes the correspondence piece 14 and scrip 16.

The envelope piece 16 can include a plurality of foldable leafs 36, 42, 44, 46 and adhesive areas 20, 38 for use in assembling the envelope piece 18 into an envelope. In one embodiment, the adhesive areas 20, 38 may include wax paper coverings or other coverings that can be peeled off to expose the adhesive when the adhesive area needs to be used, for example, to assemble or to seal an envelope or envelope piece. One of the plurality of foldable leafs can form an envelope lid 36 that features an adhesive area 38 on one surface for use in sealing the envelope. The envelope further includes a pocket when assembled that may be formed as described below or that may be pre-formed during manufacturing by the adhesion of two plies of materials together in the two-ply and other multi-ply embodiments of the invention. In an exemplary embodiment, where the plies are intended to form the envelope pocket, the plies will be connected by adhesive on only three sides with the fourth side being open to receive the insertion of contents intended by the user to be delivered in the envelope. The assembled envelope can be sized and shaped to permit insertion of the correspondence piece and scrip into the pocket for mailing to the giftee.

In one embodiment, the envelope piece can include a central back panel flanked by first and second side panels, a top lid portion, and a bottom front portion. The central back panel, first side panel, second side panel, top lid portion, and bottom front portion each include front and rear surfaces. Once the envelope piece has been detached and removed from the sheet, the first and second side panels can each be folded over to place them in contact with the front surface of the central back panel. The bottom front portion can then be folded upward and secured by adhesive to the first and second side panels. The adhesive can be featured on either two side edges of the bottom front portion or on the rear surfaces of the first and second side panels so that when the side panels and bottom front portion are folded and assembled, the adhesive can secure the parts of the envelope piece together. The front surface of the top lid portion can also feature an adhesive that can be used to seal the lid of the envelope to the rear surface of the bottom front portion once the envelope is assembled and contents have been inserted therein. The rear surface of the central back panel forms the back of the assembled envelope and can include space or blank lines for writing or imprinting delivery and return addresses and indicia over which a postage stamp may be affixed.

The detachable components can further include a postage stamp, for example, a U.S. postage stamp, that can be affixed to the envelope as postage paid for mailing the envelope and its contents, the contents being one or more of the other assembled detachable components. In another embodiment, the stamp can be pre-printed directly on the envelope piece or imprinted directly thereon by the user rather than having a separate stamp that must be imprinted as a detachable component and then removed and affixed to the envelope.

In addition to the correspondence piece 14, scrip 16 and envelope, the detachable components of the multi-purpose form can also feature a coupon 24. The coupon 24 may be used by the user or recipient to obtain a discount price for goods or services or free goods or services of value sold or made by a particular retailer or manufacturer.

In one embodiment, the detachable components of the multi-purpose form can include one or more product stamps that show gift representations. The product stamps can be provided as part of the multi-purpose form and may take the form of stamps, stickers, or labels that may be affixed to the correspondence piece 14 or to the scrip 16 to provide the giftee with a visual identification of the gift that is being given by the giftor. The gift representation appearing on a front surface of each product stamp can feature text (e.g., words, numbers, or typographical symbols), symbols or images that identify the gift being given. For example, if the gift being given to the giftee is cash, several product stamps that show gift representations in the form of specific dollar amounts may be provided for attachment by the giftee to the correspondence piece 14 or to the scrip 16. In another example, if specific goods are being given as the gift, the multi-purpose form can include several product stamps illustrating gift representations that show images or text identifying the goods being gifted. Services may also be identified by product stamps showing gift representations in a similar manner.

The multi-purpose form can also include instructions for folding and assembling the detachable components into their respective end pieces. e.g., folding the correspondence piece 16 to form a greeting card, or folding and assembling the envelope piece 18 to create an envelope. The instructions can be a part of the frame or a separate detachable component of a sheet of the multi-purpose form. The instructions can be text, schematic drawings, or a combination of both.

The multi-purpose form can also feature a detachable component that is a register. The register can comprise a series of lines or cells in which the recipient may write or other enter purchases made using the scrip so that the remaining value of funds on the scrip can be tracked. The register can be similar to a check register of the type that is commonly included in check passbooks. In an exemplary embodiment, the record of funds available on the scrip can also be stored and accessed online via the website.

The multi-purpose form can also feature a detachable component that is a business card. The business card may be a single-panel two-dimensional piece that does not require folding, or the business card can be a multi-panel folding expandable business card such as, for example, those described in U.S. patent application Ser. No. 11/365,071, which is incorporated by reference herein in its entirety. The scrip 16 of the multi-purpose form may also be constructed as a detachable component that, once assembled, is also expandable in a manner identical or similar to the expandable business card.

In an exemplary embodiment, a plurality of multi-purpose forms can be packaged into a single package for distribution to a user. The package of multi-purpose forms can be flat. The package of multi-purpose forms can be used as desired by the user for various occasions and for making gifts to various giftees. In this embodiment, the multi-purpose forms may be blank with little or no pre-printed information (e.g., images or text) on them. In this way, the user can select the user's own customizations or stock images and text made available through the software and service provider to customize the sheets of the multi-purpose form for birthdays, holidays, anniversaries, and any other occasion on which the sending of a greeting card and gift would be appropriate.

Single multi-purpose forms or packages of multi-purpose forms can be distributed to consumers by direct mail, by order or request from the consumer, at retail locations, and via distribution through insertion of the multi-purpose form into other publications or packaging of the multi-purpose form with other goods. In an exemplary embodiment, packages of multi-purpose forms can be shrink-wrapped, although in other embodiments, other known and presently unknown packaging methods and materials may be utilized.

During manufacturing, the sheets can be formatted to maximize the number of multi-purpose forms that can be packaged for Flat Rate Standard Mail in accordance with the United States Postal Service ("USPS") Direct Mail Manual specifications and regulations for USPS Flat Rate Standard Mail. To comply with USPS regulations and specifications applicable to USPS Flat Rate Standard Mail, the package of multi-purpose forms can be a minimum of about 6 inches wide×5 inches long with about 0.125-inch radius rounded corners and the packaged multi-purpose forms can be no more than about 0.75 inches in thickness from any edge of the package. The package of multi-purpose forms is flexible so that the package is capable of bending one inch from any edge without affecting the contents inside the package. The package of multi-purpose forms can also be a uniform thickness so that any bumps, protrusions, or other irregularities do not cause more than one-quarter of an inch in variance in the thickness of the package. These dimensions minimize the postage expense for mailing each package of multi-purpose forms. The paper from which the multi-purpose forms are constructed may be almost any weight, but in exemplary embodiments, can be 50 lb. or 60 lb. base weight uncoated book paper or 20 lb. or 24 lb. base weight bond weight paper. Using the 24 lb. bond paper or the 60 lb. uncoated book paper, thirty multi-purpose forms, each including a single sheet, can be packaged within a single package for delivery or distribution to a consumer as USPS Flat Rate Standard Mail. If lighter weight papers such as the 20 lb. bond paper or the 50 lb. uncoated book paper are used, more than thirty multi-purpose forms may be packaged and shipped to a consumer using USPS Flat Rate Standard Mail rates.

During manufacturing and packaging, each package of multi-purpose forms can be personalized with a name and address of a different consumer. The first or last multi-purpose form of the collated sets of multi-purpose forms in a package can be coded with a readable mark that is printed thereon. When scanned or otherwise digitally or electronically recognized by the manufacturing and packaging machinery, the readable mark can be used to separate the multi-purpose forms into collated sets. Each collated set of multi-purpose forms can then be wrapped using methods and materials, e.g., shrink-wrapping or polyethylene bagging, to create individual packages of multi-purpose forms for mailing to consumers. The consumer's mailing address can be printed by inkjet or another printing method on the surface of the packaging, on one of the packaged multi-purpose forms, or on a separate sheet of material packaged on top of the multi-purpose forms. The mailing address may also be affixed to the surface of the package on a label.

Multi-Component Forms

In an exemplary embodiment, the invention relates to a single-sheet multi-component form having a correspondence piece 50, an envelope 52, and a variable element 54 as shown in FIGS. 9-12. As described previously herein, the multi-purpose form can be manufactured from any material that can be fed through a printing device and which has at least one surface onto which the printing device may print. Suitable materials from which the multi-purpose form can be manufactured include paper, plastic, metallic foil, semi-metallic foil, paperboard, or any other material capable of passing through a printing device and having at least one surface onto which the printing device may print. The material can be of any weight, thickness, or rigidity as long as the material is sufficiently flexible so as to be capable of mechanical movement through machinery of the printing device. After printing, the multi-purpose form can be imprinted, e.g., spot imprinting in one or more isolated areas on at least one surface of the multi-purpose form or full page imprinting on at least one full surface of the multi-purpose form. Imprinting on the multi-purpose form may be accomplished using the same printing device used for printing or using one or more other different printing devices in one or more steps.

The exemplary multi-component form can be created from two plies of material. The two plies can be sandwiched together and connected by an adhesive. The two plies of material can be attached together by adhesive during manufacturing, for example, after printing. In another embodiment, the two plies of material can be printed and then attached together by the user using an adhesive after the user has completed any necessary imprinting of information or customizations. In still another embodiment, the two plies of material can be printed and then attached together by the user before imprinting any information or customizations thereon. In exemplary embodiments, the form can be 8.5 inches by 11 inches. Each 8.5 inches by 11 inches sheet can be manufactured to include two plies that are glued together during manufacturing and delivered to the user as a single double-ply (or two-ply) sheet.

In another embodiment of the exemplary multi-component form, the form can be created from a single 11 inches by 17 inches sheet of material that is folded in half widthwise and connected together at a first free end and a second free end with an adhesive. The unfolded 11 inches by 17 inches sheet of material can be fed through a printing device for printing or imprinting information and customizations. A centerline perforation, at which the 11 inches by 17 inches sheet can be folded in half, can be used to separate the sheet into two letter sized (8.5 inches by 11 inches) sheets, thereby allowing the user to imprint the combined greeting card, envelope and variable element printable and imprintable form using any printing device such as, for example, a desktop printer.

Each ply of the multi-component form can include a top edge 58, a bottom edge 60, a left side 64, a right side 62, a left border area 68, and a right border area 66.

Several perforations are common to both sheets. The perforations can be created during the manufacturing process. All of the multi-component's perforations described in this section are common to both sheets and go through both plies of the sheet. The top and bottom edges 58, 60 of each sheet can contain a visual frame 100 and a perforation 72, 74, 76. The distance from the top edge 58 to the perforation 72 can be about 0.625 inches. The left border area 68 of each ply can contain a visual frame area 100 and a perforation 76 extending from the top edge 58 to bottom edge 60. The distance from the left side edge 64 of the sheet to the perforation 76 can be about 0.375 inches. The right border area 66 of each ply can contain a combination of vertical perforations and die cuts (with or without tics). After imprinting the form, the resulting imprintable area can be about 7.75 inches by 9.75 inches. If the form is printed and manufactured from start to finish on a printing press, the individual detachable pieces can be larger and no frame would be required for end user assembly.

The form can have three common horizontal perforations 80, 82, 84. A first horizontal perforation 80 can be parallel to the top edge 58 and extend across the entire form, separating the form into a top section and a bottom section. The top section can be the correspondence piece 50, e.g., a greeting card. A second horizontal perforation 82 can be parallel to the top edge 58. The second horizontal perforation 82 can be located at a 90° angle from a left side frame perforation 76, thereby forming a detachable component 86 that can be used for creating and printing or imprinting a postage stamp. A third horizontal perforation 84 can be parallel to the top edge 58. The third horizontal perforation 84 can be located at a 90° angle from the left side frame perforation 76 and below the second horizontal perforation 82, thereby forming an area 88 for printing or imprinting an advertisement or a game token, which can also be a detachable component.

The form can have two common vertical perforations 92, 94. A first vertical perforation 92 can be parallel to the left edge 64 and 2 inches from the left frame perforation 76. The first vertical perforation 92 can be perpendicular to the first horizontal perforation 80. The first vertical perforation 92 can form a section 86 that is used as a scrip, e.g., as a gift card. A second vertical perforation 94 can be parallel to the left edge frame perforation 76. The second vertical perforation 94 can be located between the first horizontal perforation 80 and the second horizontal perforation 82. This area 86 can form a section that is a stamp. The second vertical perforation 94 can also define a second 88 area that can be used for printing or imprinting an advertisement or a game token. The remainder of the bottom section forms the mailing envelope. In one embodiment, the envelope can be pattern glued together.

The form can include a first vertical score 96 and a second vertical score 98. Both scores 96, 98 are common to the first and second plies of the multi-component form. The first vertical score 96 can be positioned to be in the center of the page and can be perpendicular to the top edge 58. The first vertical score 96 can be parallel to the left and right edges 64, 62 and can be located between the left frame perforation 76 and the right frame perforation 74 or kiss die cut.

The second vertical score 98 can be parallel to the left hand frame perforation 76. The second vertical score 98 can be perpendicular to the bottom frame perforation 72 and located between the third horizontal perforation 84 and the bottom frame perforation 72. The second vertical score 98 can provide a mechanism that allows access to the preprinted register or to a bar code or QR code that can be located and pre-printed on one or more surfaces of the scrip 54.

Figure 9:
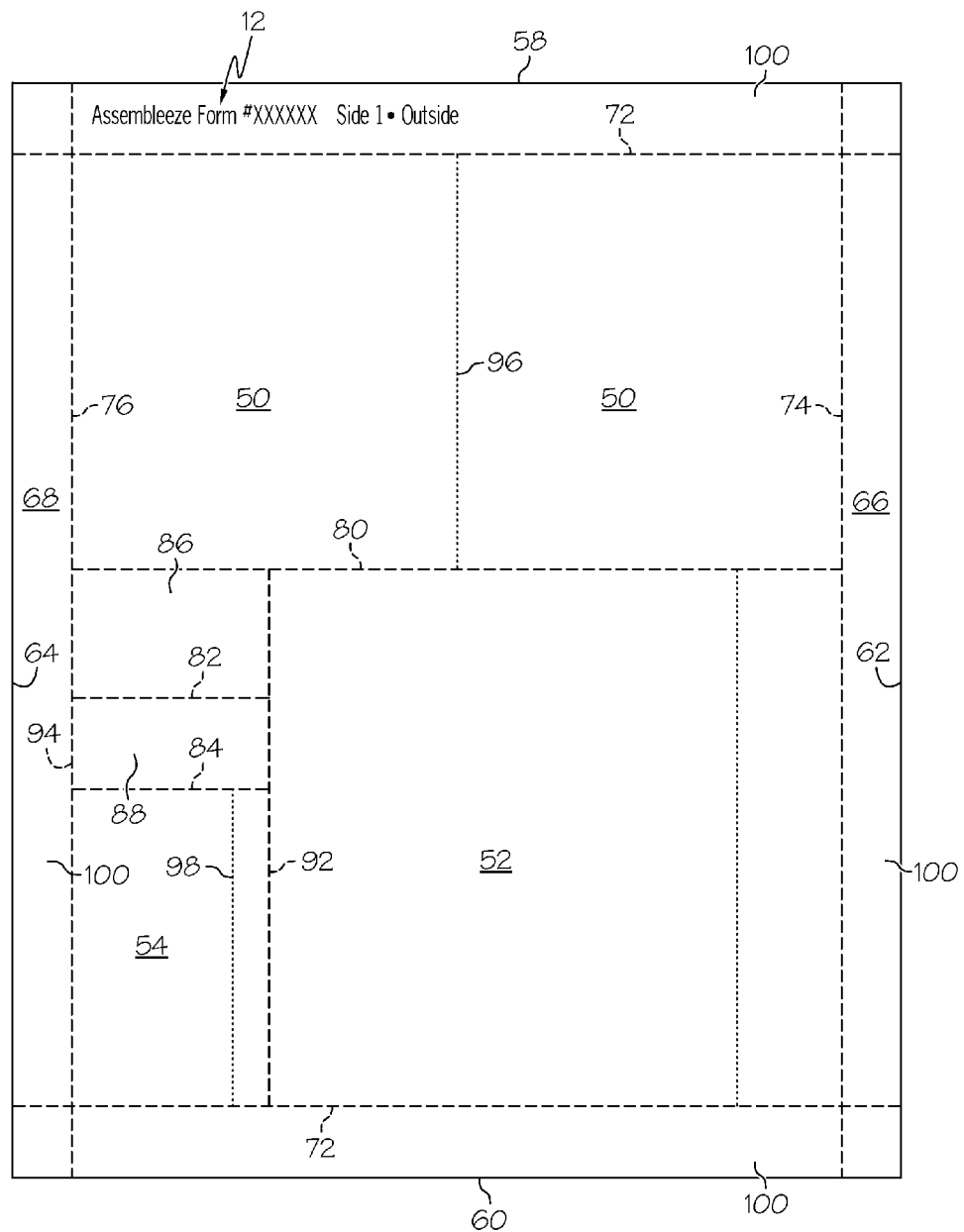
FIG. 9 is a top plan view of an exterior surface of a first side of a multi-component form.

Each side of each ply can feature additional specifications that are primarily based on printing and glue patterns. Referring to FIG. 9, the exemplary embodiment can include three printed areas and no glue areas. The printed areas can include: (1) a frame 100, (2) a postage stamp, and (3) an advertising space. The frame 100 can be a border that becomes disposable when detached, but which is sufficiently stable for alignment on a printing device, e.g., a desktop printer, for imprinting. The frame 100 can also define areas to be imprinted and can provide space for full bleeds. Additionally, the frame 100 provides a space for digitally printing a variable unique form identification number 12 which can identify a lead edge of the form for proper loading into the printing device.

The postage stamp described herein permits the user to print U.S. Postal Service (USPS) stamps that may be paid for as part of gift card activation. Each individual postage stamp would include the required USPS-approved bar code and serial number. The advertising space can be located immediately below the postage stamp.

Figure 10:
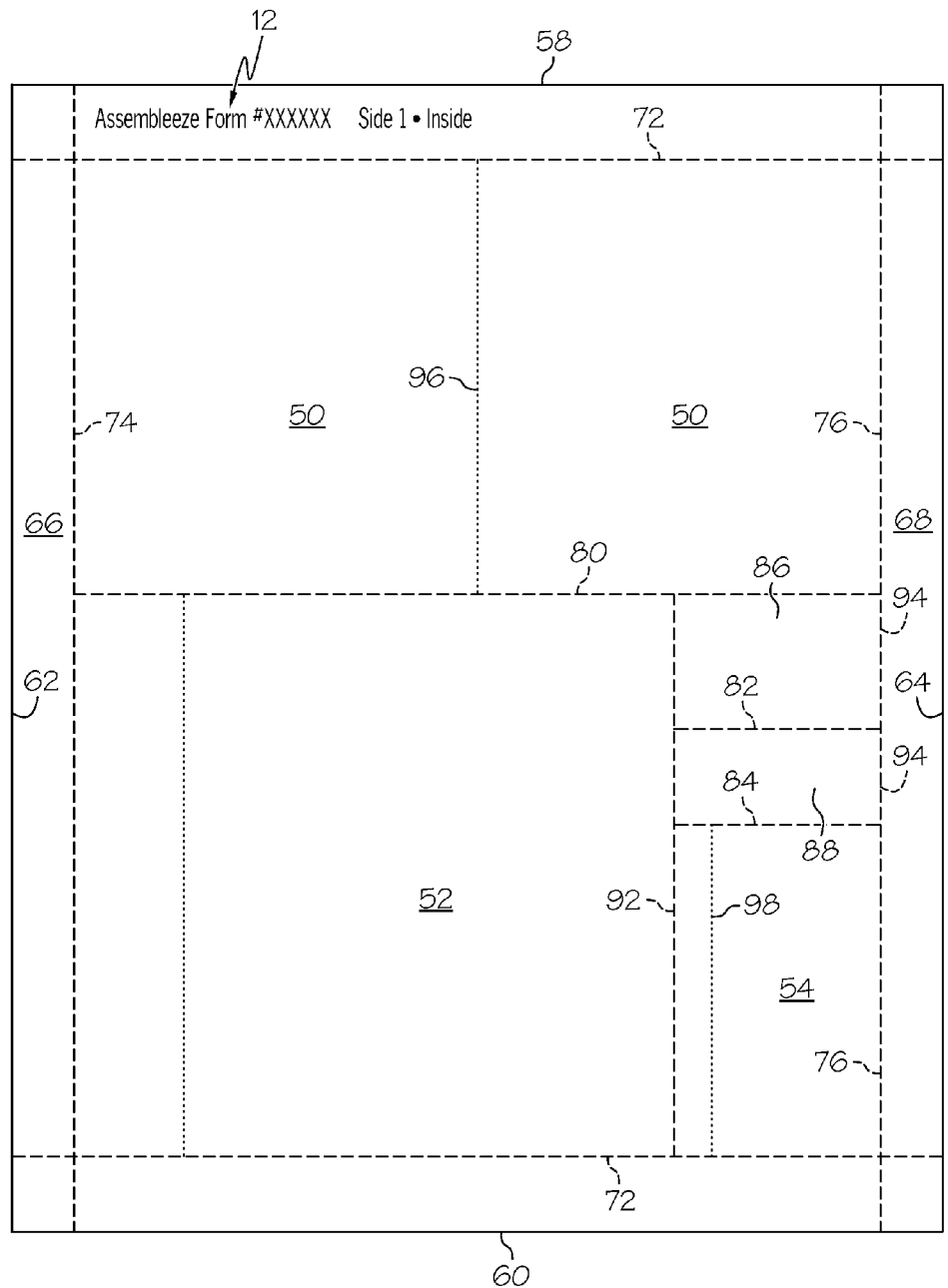
FIG. 10 is a top plan view of an interior surface of the first side of the multi-component form of FIG. 9.

Referring to FIG. 10, the exemplary embodiment of the multi-component form can include two printed areas, two variable print areas, two scores and ten pattern glue areas Printed areas can be printed during manufacturing. Gluing of the plies together during manufacturing can conceal the printed areas so that the printed areas will not be visible until the correspondence piece 50 is assembled by the user. These printed areas can be printed in full color, variable imaged, or a combination of both. The printed areas can include a first printed area and a second printed area. The first printed area can be located in an upper right corner of the form and can be adjacent to and within the frame perforations. A left hand margin of the first printed area can include a score for folding during the assembly process. The score can be located between the first horizontal perforation 80 and the second horizontal perforation 82, midway between the frame vertical perforations.

The second printed area can be located in a lower right corner of the form and can be adjacent to and within the frame perforations. A left margin of the second printed area can include a score for folding during the assembly process.

Variable print areas can be located in generally the same areas of the form as the first and second printed areas; however, the description herein of the variable print areas should not be considered a limiting factor as any area of this form can be printed in full color, variable imaged, or a combination of both.

Pattern glue areas can form the border of every detachable component created by perforations that has a glue line or adhesive area. The glue line or adhesive area can be added to the form during the manufacturing process. The location of the glue lines or adhesive areas on the form can form patterns. The patterns are used to create enough adhesion to ensure that the two plies of the form are glued solidly together, that the form is flat for imprinting, to permit the perforations defining the detachable components to separate properly for assembly, to form the pages of the correspondence piece, and to form the pocket of the envelope.

Figure 11:
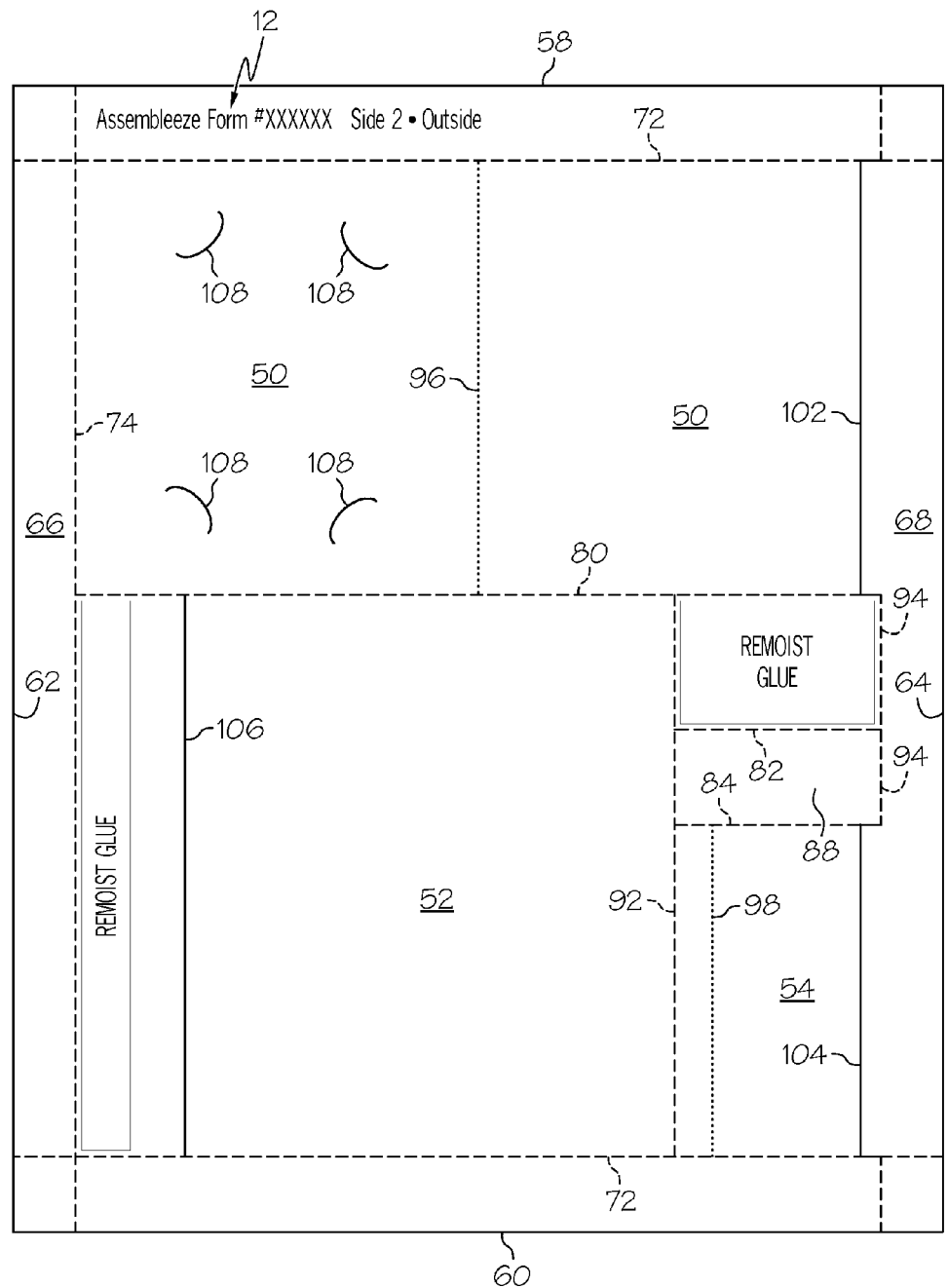
FIG. 11 is top plan view of an exterior surface of a second side of the multi-component form of FIG. 9.

Referring to FIG. 11, the exemplary embodiment of the multi-component form can include two printed areas, two variable print areas, two scores and ten pattern glue areas and can generally be a mirror image of the interior surface of the first ply shown in FIG. 10. However, the second ply can contain differences in die cuts without which the final form will not function. The die cuts and kiss die cuts can be added during manufacturing.

Figure 12:
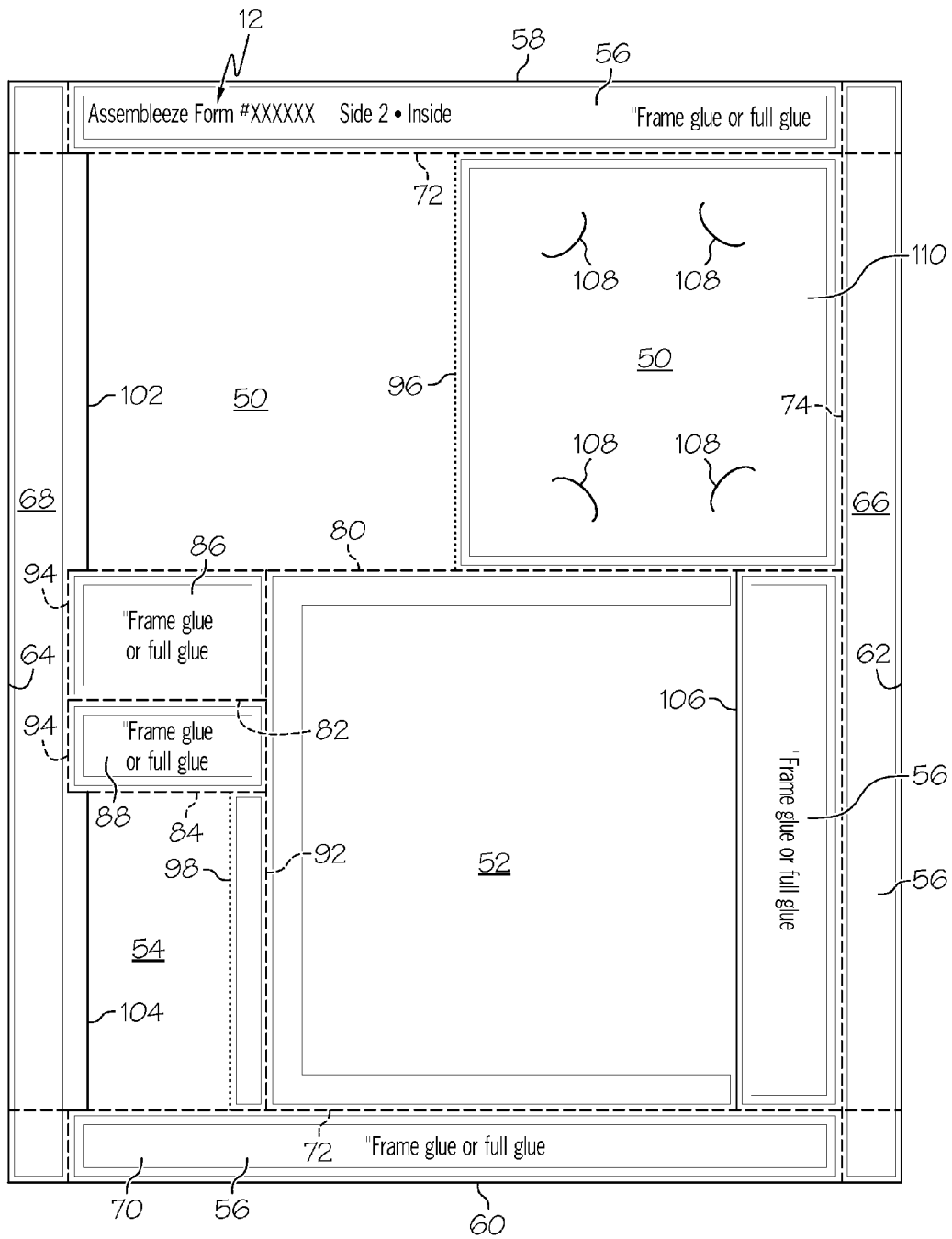
FIG. 12 is a top plan view of an interior surface of the second side of the multi-component form of FIG. 9.

Referring to FIG. 12, the exemplary embodiment of the multi-component form can include two re-moist glue areas 56, two scores and three kiss die cuts. The re-moist glue can be applied as a printed area. The areas to which the re-moist glue is applied can include the postage stamp and a flap (or lid) of the envelope. The re-moist glue and the perforations allow the postage stamp to be removed from the sheet and affixed to the envelope while the re-moist glue on the envelope flap allows the user to seal the envelope for mailing or delivery to a recipient.

Kiss die cuts 102, 104, 106 can be added in one of the last steps of manufacturing. Kiss die cutting can take place after the plies have been glued together and the kiss cut will only go through the top layer of the two-ply form, i.e., through the first ply. The form can include three vertical kiss die cut areas 102, 104, 106 as shown in FIGS. 11 and 12.

An upper, or first, vertical kiss die cut 102 begins at and is perpendicular to the upper frame perforation 72. The upper vertical kiss die cut 102 may or may not contain tics depending on how the form will be imprinted. The upper vertical kiss die cut 102 can serve to reveal the bottom of the correspondence piece 50 which can be used as advertising space. The advertising space can be full color printed during manufacturing.

A lower, or second, kiss die cut 104 begins at the bottom of and is perpendicular to the third horizontal perforation 88. The lower vertical kiss die cut 104 forms a bottom edge of the scrip 54. The scrip 54 can be printed with or without inkjet personalization during manufacturing. The second kiss die cut area 104 is located in an upper left quadrant of an inner surface of the correspondence piece 50.

A third vertical kiss die cut 106 can be oriented parallel to the left vertical frame perforation 76. The third kiss die cut 106 can begin at the first horizontal perforation 92 and is perpendicular to the bottom frame perforation 72. The third vertical kiss die cut 106 can provide an opening to the envelope pocket that is created when the two plies are glued together.

The vertical kiss die cuts can provide a means to attach the scrip to an inner front surface of the correspondence piece 50, which will serve to display the scrip 54 when the correspondence piece 50 is opened by the recipient. The die cuts 108 can resemble 0.5 inches round corners, which can be precisely placed. The top left and bottom right die cuts 108 can be 3.125 inches apart when measured at a 45° angle. In one embodiment, space between these two die cuts 108 can allow the gift giver to place a conventional plastic CR-80 gift card between the die cuts 108.

The top right and bottom left die cuts 108 can be about 3.125 inches apart when measured at a 45° angle. In one embodiment, space between these two die cuts 108 can permit the gift giver to place the gift card created within this form onto the inner front surface of the greeting card.

The multi-component form can be manufactured in several ways depending on how the forms are to be distributed and used. The form can be completely (full color) printed on its interior or exterior surfaces or on both surfaces, with or without ink jet numbering, ready for use by the end consumer. The form can also be partially printed with or without ink jet numbering, leaving areas to be imprinted by a service bureau or end user.

The form can also feature the interior sheets being printed with or without inkjet numbering, and the exterior surface left blank for the end user to imprint and assemble, although other variations of printing the various surfaces of the form are contemplated herein. Use of the multi-component form can include personalization, printing, imprinting, handwritten personalization, and various assembly procedures.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A multi-component form comprising:
   a single sheet comprising at least two connected plies of material, wherein the single sheet further comprises at least the following detachable components:
   an envelope, wherein the envelope comprises a pocket and a score line that can be broken to open the pocket;
   a postage stamp for affixing to the envelope as postage for mail delivery of the envelope and its contents to a recipient;
   a correspondence piece, wherein the correspondence piece comprises an item selected from the group consisting of: a greeting card and a post card; and
   a variable element comprising a scrip;
   wherein the correspondence piece and variable element are insertable into the envelope as contents for mailing to the recipient.

2. The multi-component form of claim 1, wherein the at least two connected plies of material comprise two separate and distinct sheets of material.

3. The multi-component form of claim 1, wherein the at least two connected plies of material comprise two halves of a single sheet of material folded widthwise at a center line.

4. The multi-component form of claim 1, wherein the sheet further comprises a frame to which the detachable components are attached and are detachable therefrom.

5. The multi-component form of claim 1, wherein the single sheet further comprises an additional detachable component on which a photograph can be imprinted to create a wallet-size photograph capable of fitting into a wallet.

6. The multi-component form of claim 1, wherein the pocket is formed in a space between the two connected plies of material of the sheet, the two plies being adhered together on three sides.

7. The multi-component form of claim 1, wherein the envelope further comprises a lid portion comprising a strip of adhesive for sealing the envelope.

8. The multi-component form of claim 1, wherein the scrip comprises an item selected from the group consisting of: a gift card, a gift certificate, a coupon, and any non-monetary certificate that is redeemable for currency, goods, or services of value.

9. The multi-component form of claim 1, wherein the sheet comprises lines of separation from which the detachable components can be separated.

10. The multi-component form of claim 9, wherein the lines of separation comprise perforations.

11. The multi-component form of claim 1, wherein the sheet comprises a first surface, a second surface, a top edge, a bottom edge, and two side edges.

12. The multi-component form of claim 11, wherein the sheet comprises pre-printed information printed on at least one of the first surface and the second surface.

13. The multi-component form of claim 1, wherein the detachable components comprise customizable spaces on which a user may imprint or affix the user's own customizations.

14. The multi-component form of claim 13, wherein the customizations comprise at least one imprinted, written, drawn, embossed, or affixed item selected from the group consisting of: text, an image, a symbol, a label, and a stamp.

15. The multi-component form of claim 1, wherein each individual multi-component form comprises a form identification number that uniquely identifies the multi-component form.

16. The multi-component form of claim 1, wherein the detachable components further comprise one or more product stamps.

17. The multi-component form of claim 16, wherein the one or more product stamps each comprise a gift representation.

18. The multi-component form of claim 1, wherein the detachable components further comprise a coupon.

19. The multi-component form of claim 1, wherein the single sheet comprises an additional detachable component comprising an advertising space.

20. The multi-component form of claim 19, wherein the advertising space comprises a printable or imprintable advertisement.

21. A multi-component form comprising:
   a single sheet comprising at least two connected plies of material, wherein the single sheet further comprises at least the following detachable components:
   an envelope, wherein the envelope comprises a pocket and a score line that can be broken to open the pocket;
   a postage stamp for affixing to the envelope as postage for mail delivery of the envelope and its contents to a recipient;
   a correspondence piece, wherein the correspondence piece comprises an item selected from the group consisting of: a greeting card and a post card; and
   a variable element comprising a photograph that can be imprinted to create a wallet-size photograph capable of fitting into a wallet;
   wherein the correspondence piece and variable element are insertable into the envelope as contents for mailing to the recipient.

22. A multi-component form comprising:
   a single sheet comprising at least two connected plies of material, wherein the single sheet further comprises at least the following detachable components:
   an envelope, wherein the envelope comprises a pocket and a score line that can be broken to open the pocket;
   a postage stamp for affixing to the envelope as postage for mail delivery of the envelope and its contents to a recipient;
   a correspondence piece, wherein the correspondence piece comprises an item selected from the group consisting of: a greeting card and a post card; and
   a variable element comprising a business card;
   wherein the correspondence piece and variable element are insertable into the envelope as contents for mailing to the recipient.

* * * * *